INVENTORS:
Giusto Fonda-Bonardi,
Alan S. Penfold

Alan C. Rose
Attorney

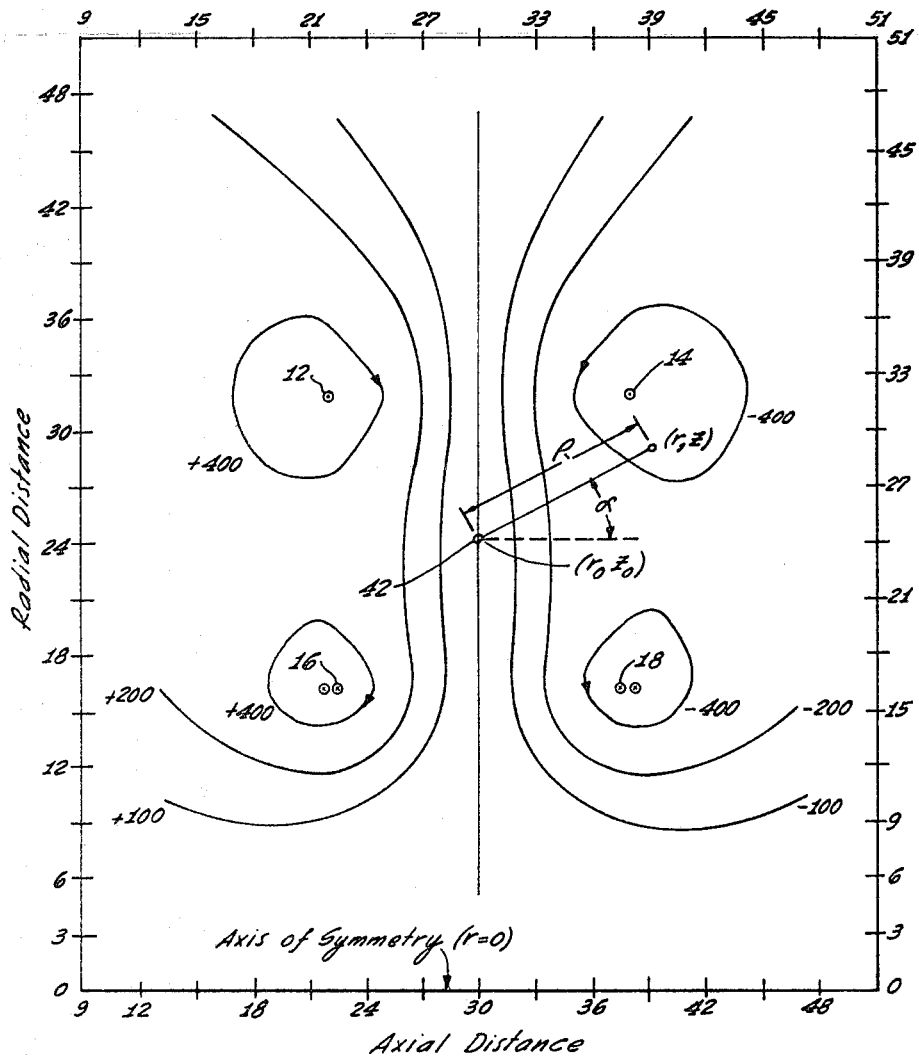

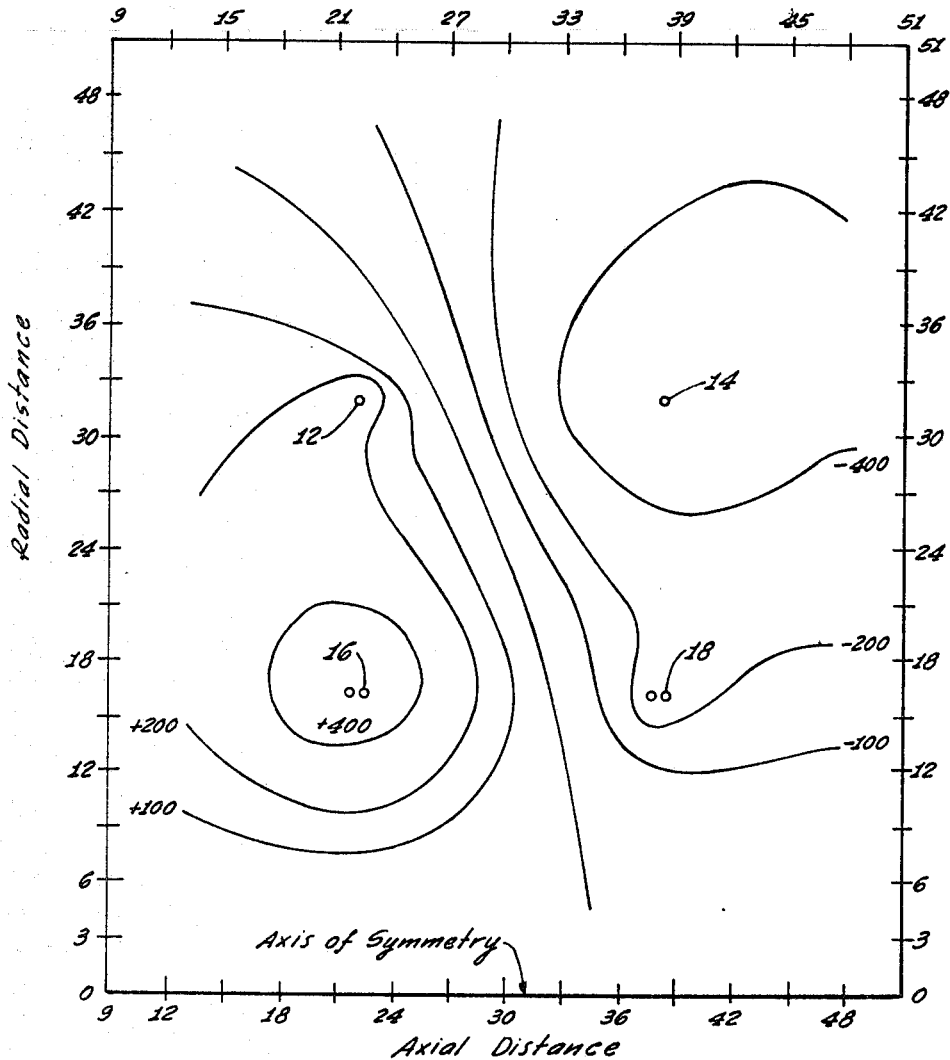

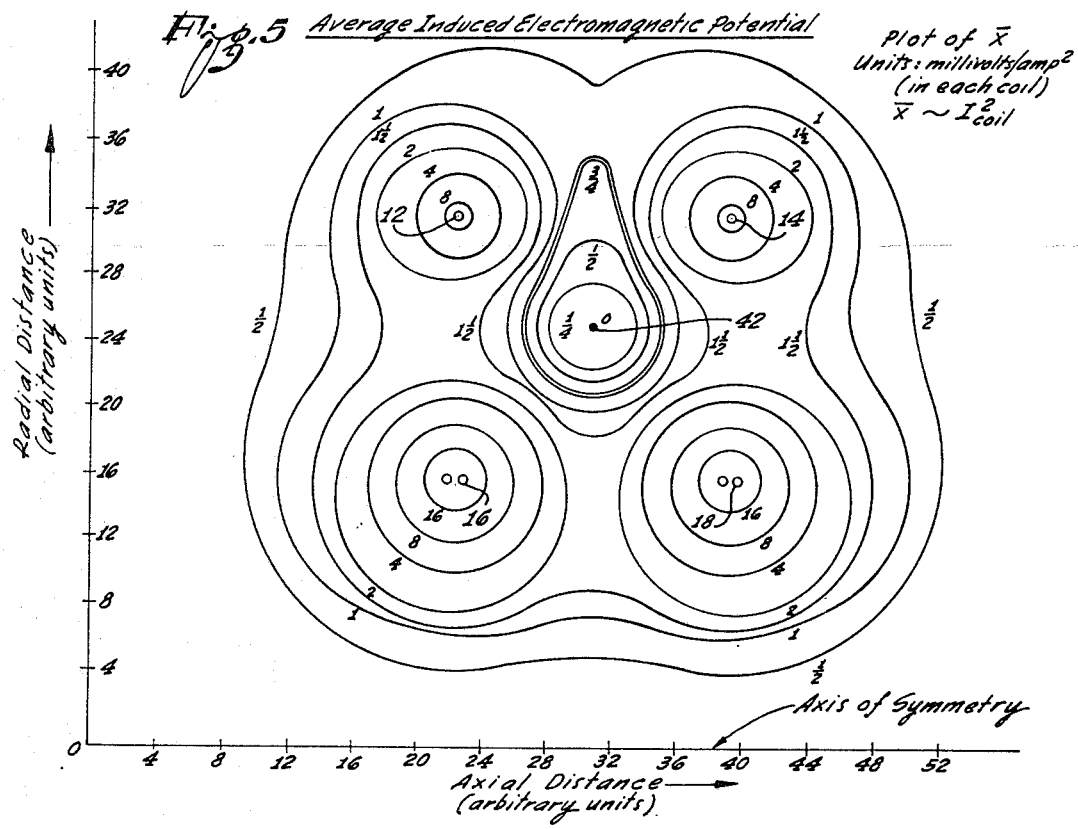
Fig. 5 Average Induced Electromagnetic Potential
Plot of $\bar{X}$
Units: millivolts/amp² (in each coil)
$\bar{X} \sim I_{coil}^2$
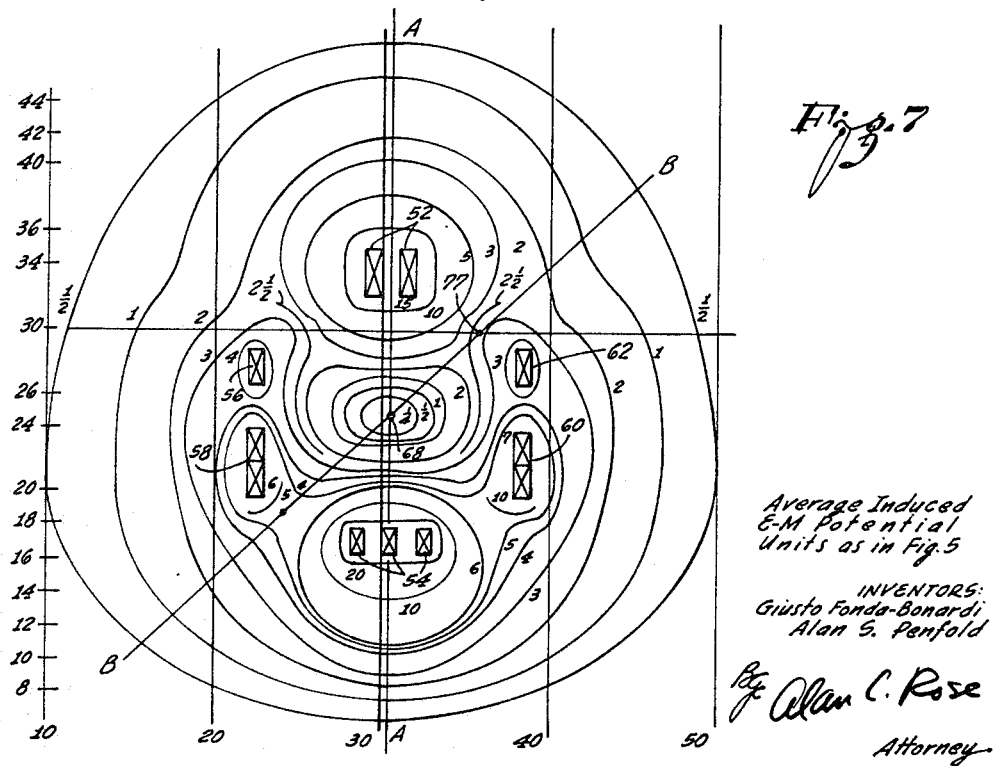
Fig. 7
Average Induced E-M Potential Units as in Fig. 5
INVENTORS:
Giusto Fonda-Bonardi
Alan S. Penfold
By Alan C. Rose
Attorney

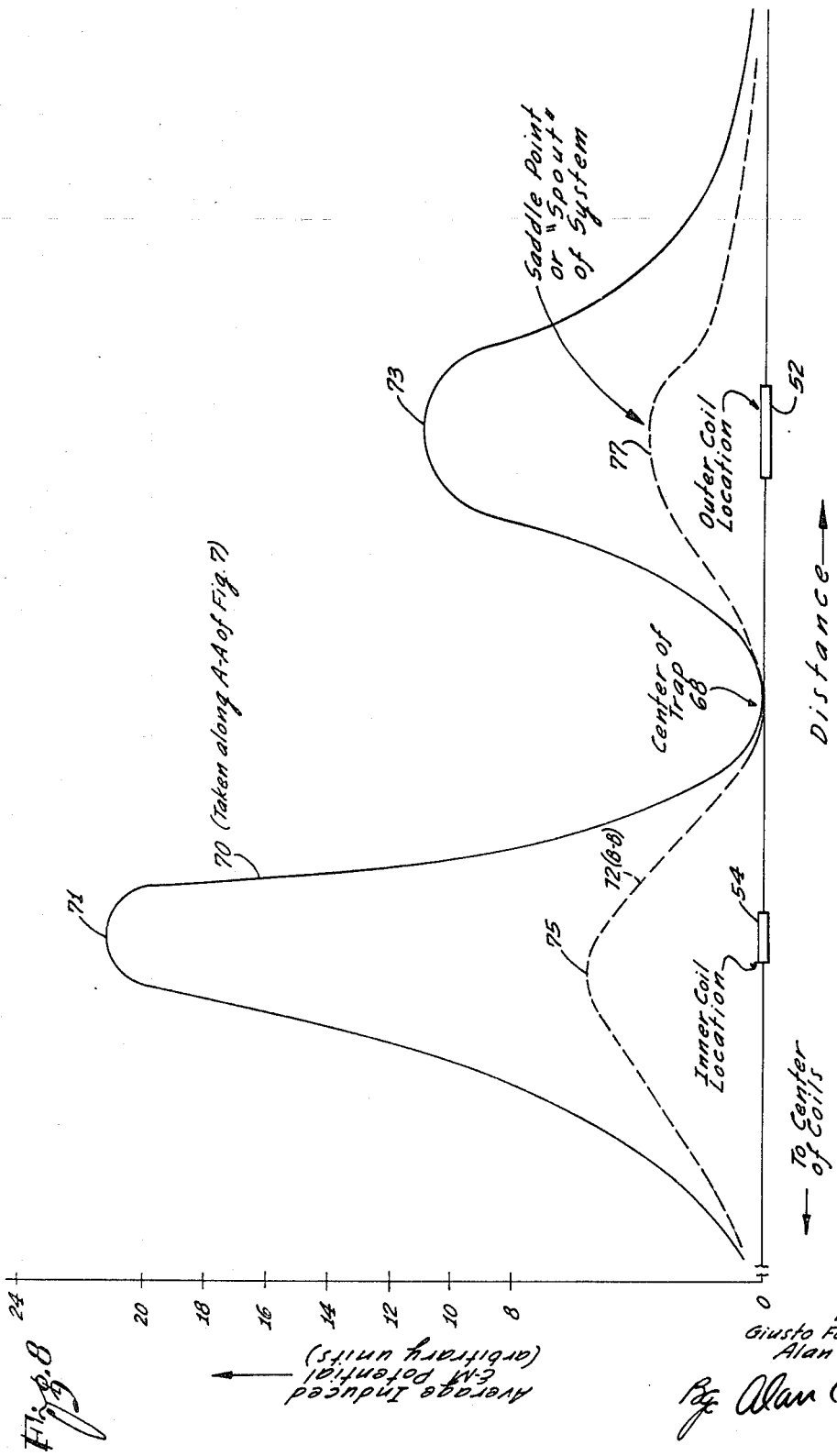

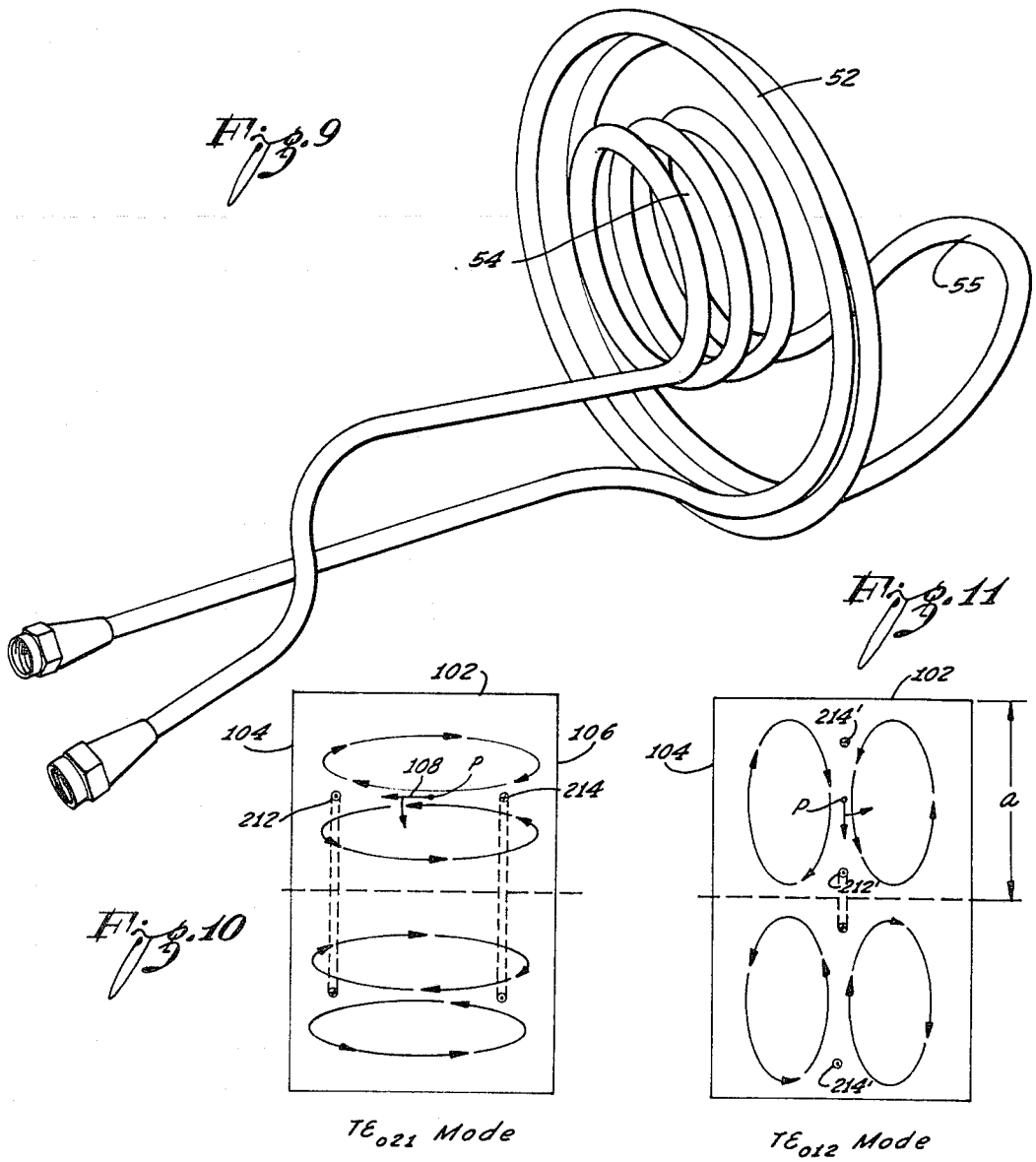

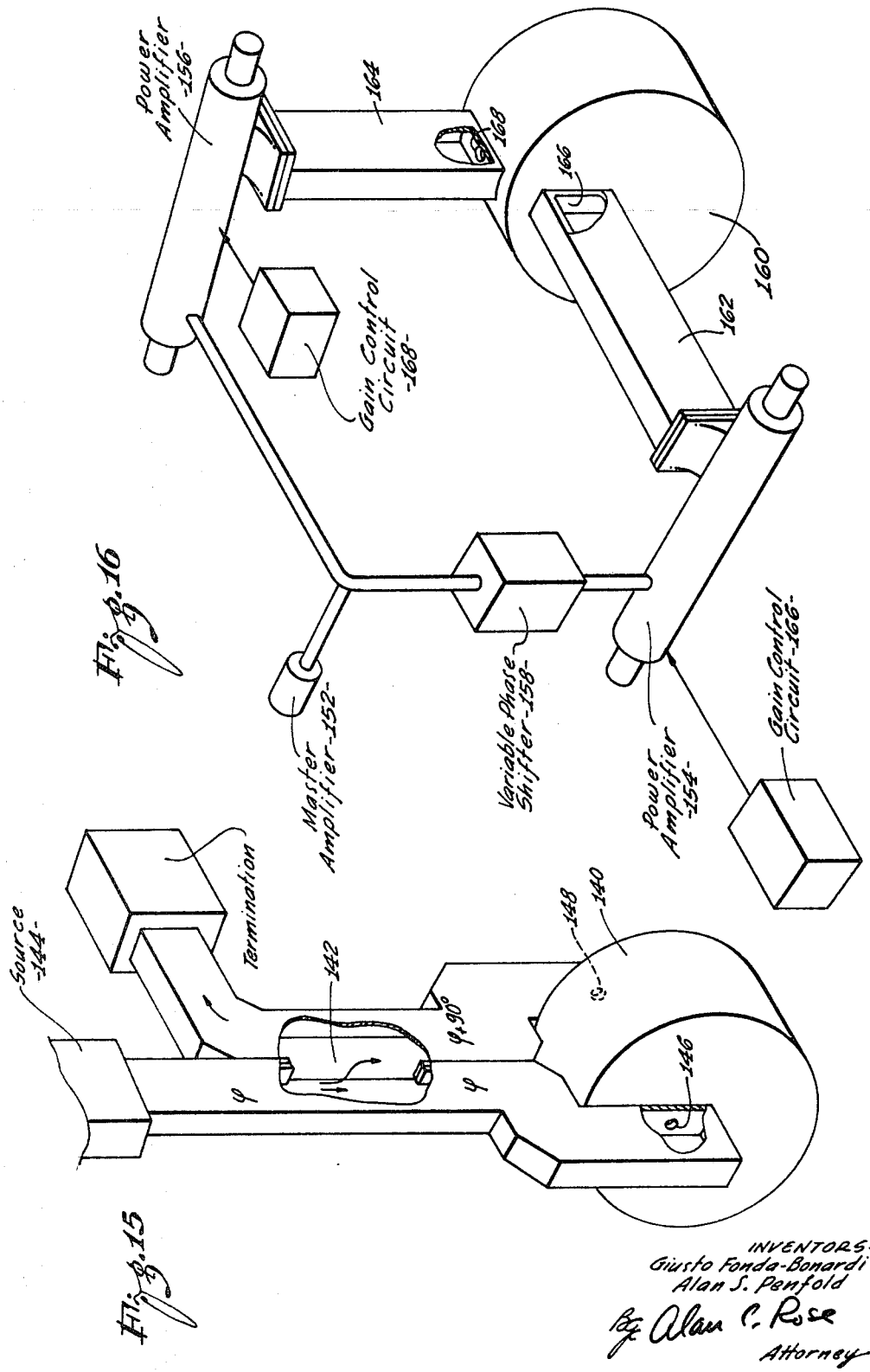

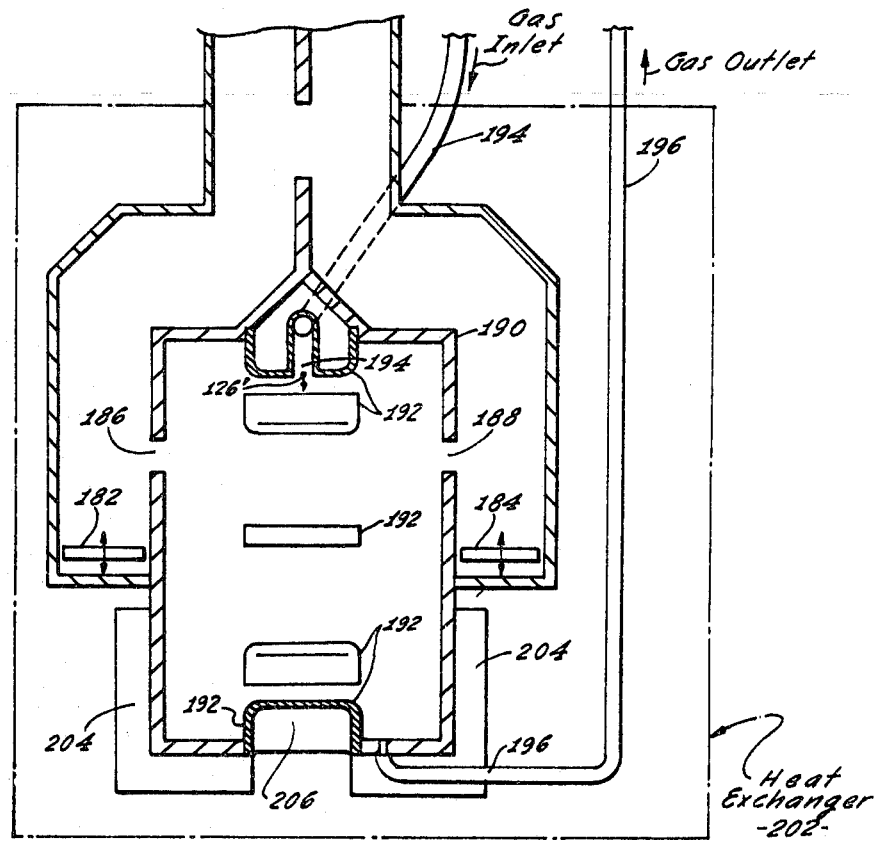
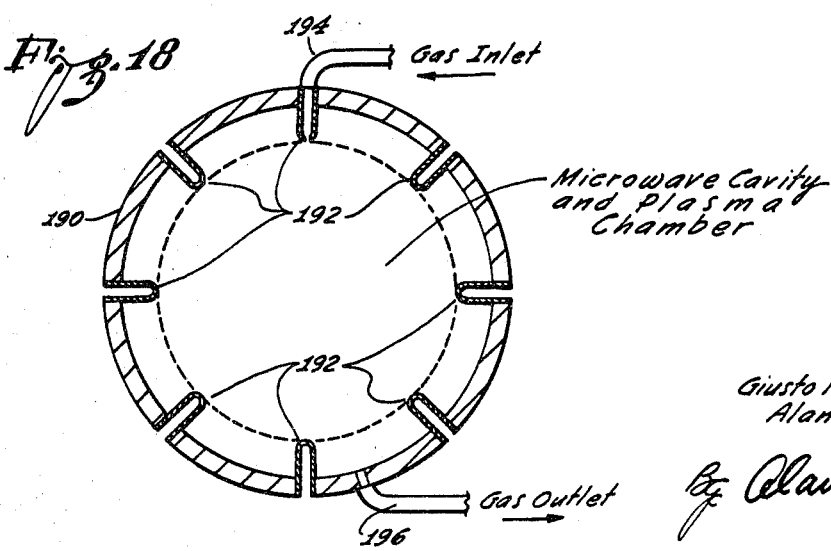

United States Patent Office 3,442,758
Patented May 6, 1969

3,442,758
CONTAINMENT OF A PLASMA BY A ROTATING MAGNETIC FIELD
Alan S. Penfold and Giusto Fonda-Bonardi, Los Angeles, Calif., assignors to Litton Industries, Inc., Beverly Hills, Calif.
Filed Aug. 7, 1963, Ser. No. 300,470
Int. Cl. H05h 1/04
U.S. Cl. 176—1                                      19 Claims

ABSTRACT OF THE DISCLOSURE

The present invention involves the use of a rotating electromagnetic field to provide a closed potential well which powerfully confines an ionized gas plasma. One structure which may be employed to implement the invention utilizes coaxial coils energized to generate an electromagnetic field which rotates at high speeds about an annular zone within an enclosing container. In a microwave implementation of the invention, a closed potential well is formed by the excitation of two microwave modes in the cylindrical cavity. The efficiency of the microwave generation apparatus may be increased by the use of vanes which pick up electrons as they leave the potential well as a result of space charge field effects.

---

This invention relates to the generation, control and utilization of gas plasmas by a moving electromagnetic field.

It has previously been proposed to employ the electromagnetic process of induction to create and accelerate a plasma. Some of the various apparatus which have been proposed heretofore for the generation, acceleration and control of gas plasmas have been unstable or transient in their modes of operation. In the case of apparatus intended to operate on a steady-state basis, confinement problems have been encountered. In other gas plasma devices, the required presence of electrodes has introduced prominent and complicated phenomena which interfere with the main purpose of accelerating, controlling or other utilization of the plasma. In general, it has not up to the present time been possible to generate ionized gas at the high temperatures, densities or velocities which are necessary for certain purposes.

The principal object of the present invention is to overcome the disadvantages noted above and to make a dynamic plasma trap which can heat and contain a plasma or produce an intense source of highly ionized material moving in a desired direction at high speeds.

In accordance with one aspect of the present invention, it has been determined that a high frequency magnetic field acting on a neutral plasma, in which electrons and positive ions are present, produces forces on the charged particles that can be derived from a potential, which is designated the inductive potential. When a suitable rotating electromagnetic field is employed, the inductive potential has a zone of reduced intensity at or near the center of rotation, and gas supplied in the vicinity of the rotating field is confined in the reduced potential zone. In one illustrative embodiment of the invention, a polyphase magnetic field produces a potential having zero intensity in an annular zone when the field is excited at frequencies above the cyclotron resonance frequencies of the ions of the gas which is used. Under these conditions, with the magnetic field rotating about the zone of reduced inductive potential, the gas is intensely ionized and is swept toward and concentrated in this zone.

With regard to specific structures which may be employed, a polyphase magnetic field may be produced by four coaxial coils with two of the coils of different diameters located in one plane and two other coils located in a spaced parallel plane. When these coils are energized in the proper phase and at the proper levels, there will be little or no cross-coupling between the coils, and a rotating field having an annular zone of reduced or zero inductive potential is produced. Other sets of coils having the required geometry can readily be designed, as will be apparent intuitively from analogy with the rotating fields present in electric motors. Microwave cavity techniques may also be employed to produce the desired high frequency rotating magnetic field configuration as described in detail below.

In the consideration of structures which may be employed in the implementation of the present invention, it may be noted that the gas plasma is normally confined within a potential "well" or "trap" which is spaced from the physical walls of the exciting electromagnetic structure. Suitable arrangements, consistent with the coil or microwave structure and the field patterns which are employed, may be used for introducing gas into the potential well, for withdrawing gas from the system outside the potential well, and for withdrawing heat generated within the system. While the primary purpose of the present invention involves generation of high density plasmas and their control and direction, it is contemplated that some particle combinations may occur within the dynamic trap. Where deuterium gas is used, in the case of a combination of two ionized deuterium molecules, the resultant helium atom and neutron will be produced with sufficient kinetic energy to eject themselves from the trap, leaving electrons in the center. As these electrons leave the potential well, they may be coupled to the exciting structure to reinforce the excited electromagnetic modes and increase efficiency. In case of significant numbers of such collisions and particle combinations, the input microwave energy may be greatly reduced or even eliminated. With such an arrangement, the deuterium or other suitable gas may be introduced into the potential well, and helium atoms withdrawn from a point within the enclosing chamber but outside of the potential well. As a collateral advantage, power may be withdrawn from the enclosing heat exchanging system.

Advantages of the devices of the present invention include the avoidance of electrodes, and the dynamic containment of a plasma solely by a rotating magnetic field.

In accordance with another broad feature of the invention, apparatus is provided for creating a high frequency induction field having a potential well, gas is introduced into the potential well, and the apparatus is energized at a sufficient level to ionize the gas and cause directive emission of charged particles from the potential well. In a preferred embodiment of the invention, the potential well is at the center of rotation of a high frequency electromagentic field; in addition, the directive emission from the potential well may be enhanced by space charge effects within the potential well; and efficiency may be increased by picking up electrons at relatively low kinetic energy levels as they are leaving the potential well.

The novel features which are believed to be characteristic of the invention both as to its organization and method of construction, together with further objects, features and advantages thereof, will be better understood from the following description taken in connection with the accompanying drawings which illustrate the techniques of the invention. It is to be expressly understood, however, that the drawings are for the purposes of illustration and description only and do not constitute limitations of the invention.

In the drawings:

FIGS. 3 and 4 are diagrams showing the magnetic field patterns present in the structure of FIG. 2 with different instantaneous relative phases applied to the sets of coils;

FIG. 5 is a plot of the average induced electromagnetic potential for the coil geometry of FIG. 2;

FIG. 7 is a plot of the average induced electromagnetic potential for the coil geometry shown in FIGS. 6 and 7;

Figure 6:
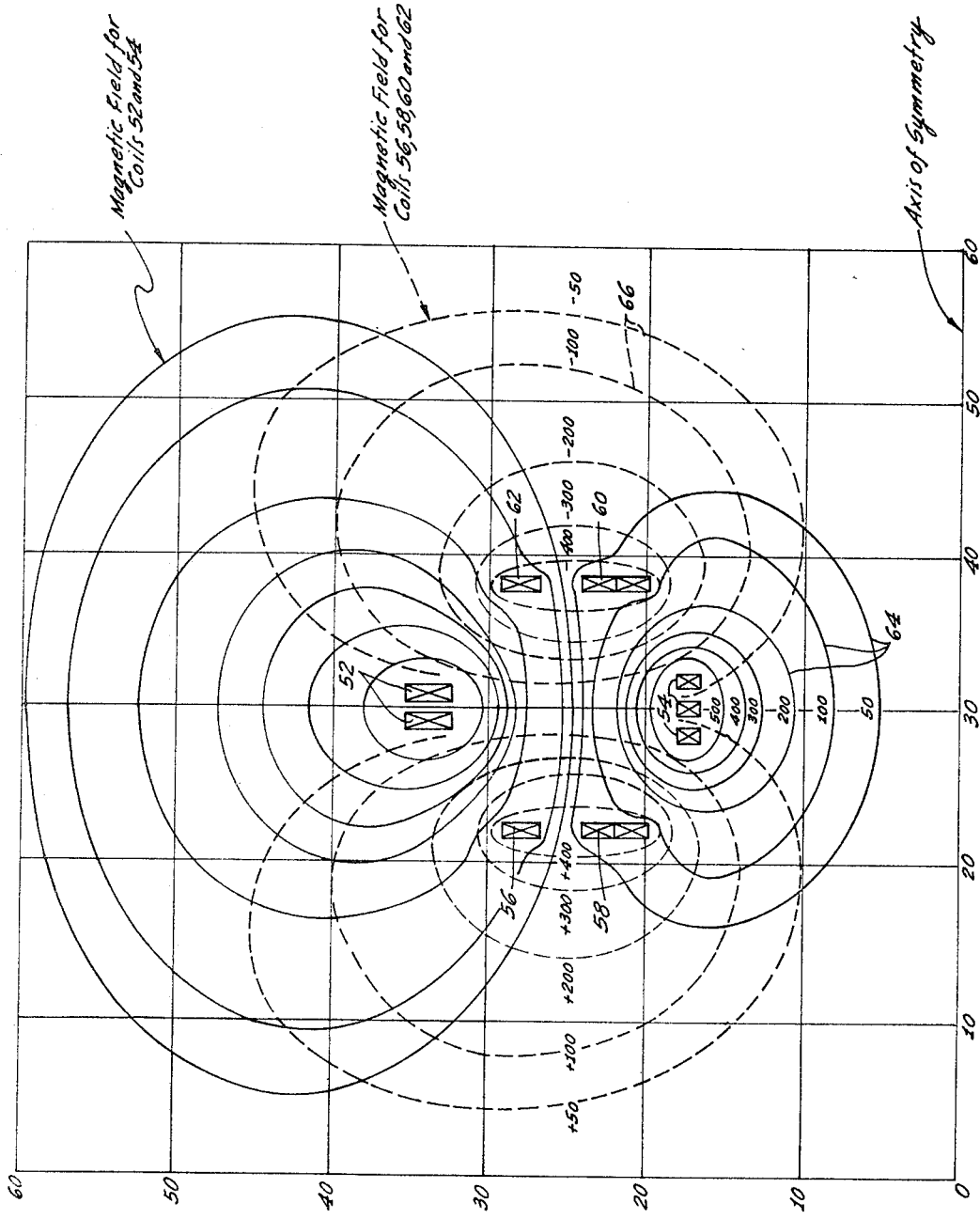
FIG. 6 is a plot of instantaneous magnetic flux for the coil arrangement pictured in this figure.
Figures 12, 13:
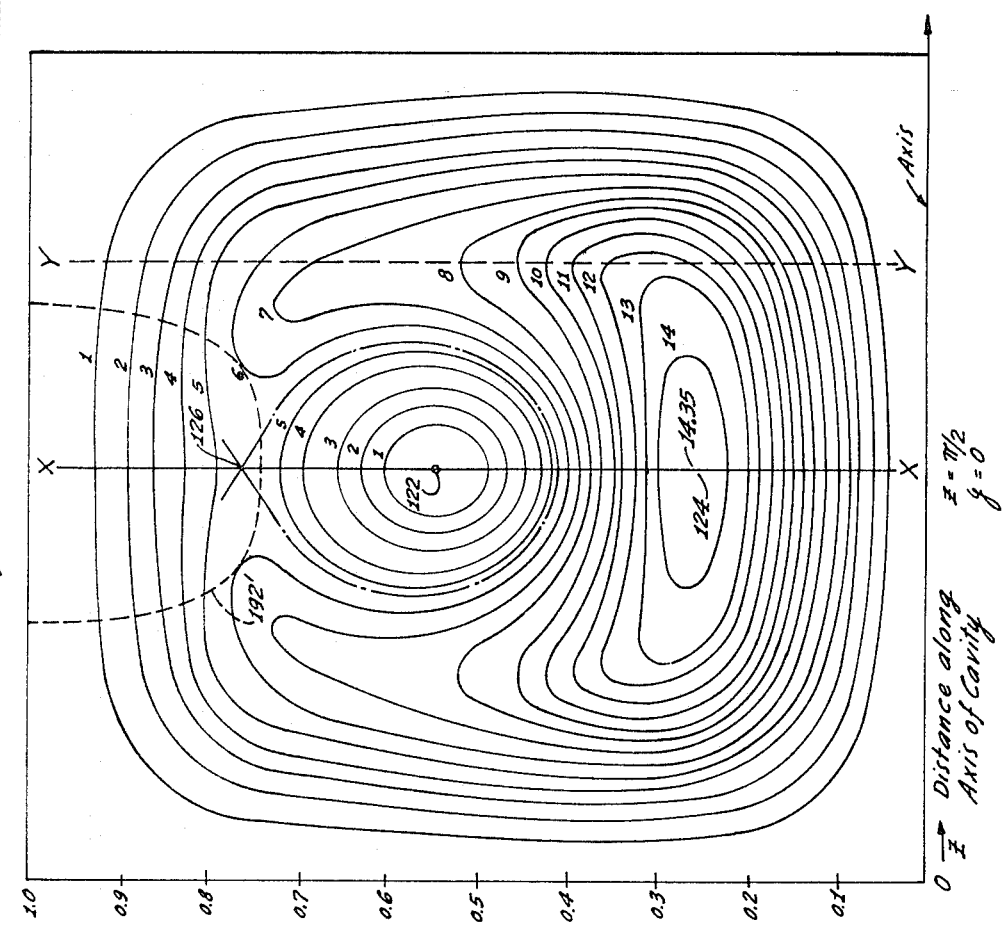

FIG. 8 includes two plots of the average induced electromagnetic potential taken along different lines through the apparatus of FIGS. 6 and 7;

FIG. 9 is a showing of a portion of the coil structure employed in an operating embodiment of the arrangement shown in FIGS. 6 and 7;

FIGS. 10 and 11 show two field patterns for cylindrical microwave cavities which produce a plasma trap when suitably excited;

FIG. 12 is a plot of the average electromagnetic inductive potential within a microwave cavity excited by the field patterns of FIGS. 10 and 11;

FIG. 13 shows two inductive potential profiles taken along different lines through the diagram of FIG. 12;

FIG. 14 is a vector diagram which is useful in the analysis of the microwave input signals required for the energization of a microwave cavity in accordance with the invention;

FIGS. 15 and 16 show two arrangements for exciting a cylindrical microwave cavity with both of the mode patterns shown in FIGS. 10 and 11; and FIGS. 17 and 18 are diagrammatic views of a microwave cavity and collateral gas and heat exchanging equipment, in accordance with the invention.

Figure 1:
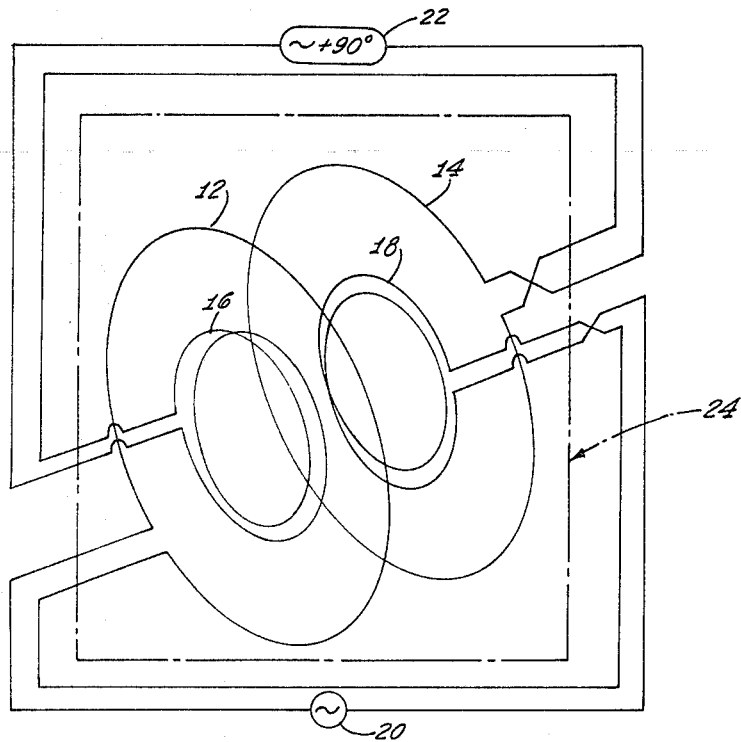
FIG. 1 is a schematic showing of an illustrative coil arrangement for providing a dynamic trap in accordance with the present invention.

With reference to the drawings, FIG. 1 is a schematic showing of one embodiment of the dynamic trap in accordance with the present invention. In FIG. 1, four coaxial coils 12, 14, 16 and 18 are employed. The outer coils 12 and 14 are single turn coils, while the inner coils 16 and 18 are double turn coils. The diameters of the outer coils are twice that of the inner coils. The coils 12 and 16 lie in the same plane, and this plane is parallel to the plane in which coils 14 and 18 lie. The coils 12 and 18 are energized in series from the alternating current source 20, but are "wound" in opposite angular senses so that the magnetic field produced by the coils will oppose each other along the axis of the structure. Similarly, coils 14 and 16 are energized by the alternating current source 22 in series opposed relationship. The alternating current source 22 provides alternating current of the same frequency as source 20 but displaced 90° in phase. This type of energization may be accomplished by a phase shifting network operated from a single source, or by the use of two oscillators which are coupled to oscillate 90° out of phase.

With the energization arrangement as described above, a rotating magnetic field is produced in the annular space between the four coils. The magnetic field rotates or convolutes about an annular line which is located substantially mid-way between the four coils 12, 14, 16 and 18.

The dashed line 24 represents a gas or vacuum tight chamber in which the coils 12, 14, 16 and 18 may be mounted. In practice, the coils may be made of copper tubing and cooled by liquid which is circulated through them from a heat exchanger as more fully disclosed below.

Figure 2:
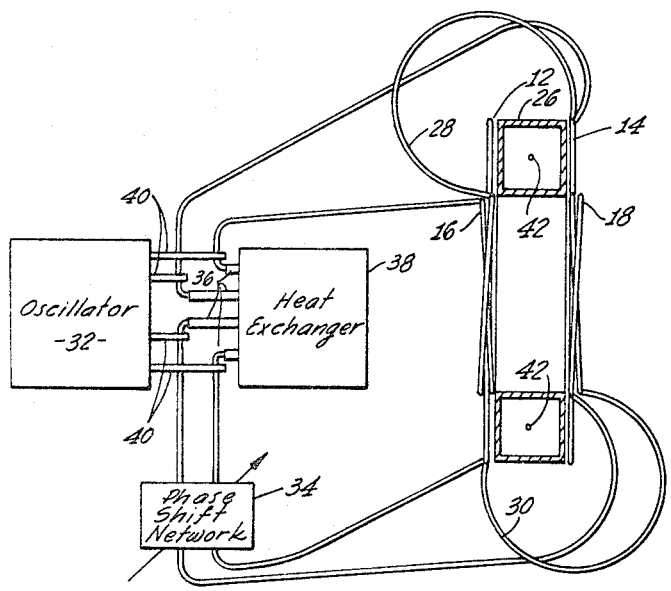
FIG. 2 is a cross-sectional view taken through the axis of a trap structure corresponding generally to that of FIG. 1, and also showing some collateral equipment.

FIG. 2 is another schematic showing of the present apparatus and represents a cross-sectional view through a system closely patterned after that of FIG. 1. For convenience, therefore, the four coils 12, 14, 16 and 18 bear the same reference numerals as those of FIG. 1. In FIG. 2, the vacuum chamber 26 is annular in form and is located immediately within the coil structures 12, 14, 16 and 18. The interconnections between the single turn coil 12 and the two-turn coil 18, which is wound in the opposite direction, may be effected by a length of copper tubing 28. Similarly, coils 14 and 16 are connected in opposed series relationship by the loop of copper tubing 30.

The energization of the coils of the apparatus of FIG. 2 is accomplished by means of the oscillator 32 and the phase shift network 34. The copper tubes forming the coils are connected by rubber hoses 36 to the heat exchanger 38 and by conductive straps 40 to the oscillator 32.

With the system energized as described above, the coils 12, 14, 16 and 18 will be energized at phases of 0°, 90°, 180°, and 270°, respectively. This mode of energization will create a magnetic field which rotates about the annular line 42, which is located substantially mid-way between the four coils. It may be noted in passing that the line 42 appears in the center of the annular vacuum chamber 26 both at the top and bottom of FIG. 2.

The nature of the magnetic field is analzyed in greater depth in connection with FIGS. 3 and 4 of the drawings. In these figures, the only structures which are shown are the coils 12, 14, 16 and 18. The axis of symmetry is the lower border of FIG. 3. The direction of current flow is indicated by the dots in coils 12 and 14, indicating that the current is coming out of the paper, and the crosses in coils 16 and 18, indicating that the current is flowing into the paper. As in FIGS. 1 and 2, the outer coils 12 and 14 are single turn coils, while the inner coils 16 and 18 are double turn coils.

FIG. 4 shows the magnetic field pattern with relationship to the coils 12, 14, 16 and 18, with a phase of 165° as compared with the field pattern at a phase of 135° shown in FIG. 3. It is noted in passing that FIGS. 1 through 4 all assume that the two sets of coils are energized with a difference in phase of 90° and that the phase of 135° and 165° of FIGS. 3 and 4, respectively, refer to progressive shifts in phase from a reference phase condition in which coils 14 and 16 are energized, and coils 12 and 18 carry no current.

A number of other plots of magnetic flux (which are not included in these drawings) have been made for other increments of phase shift. In all of these plots, as in FIGS. 3 and 4, in the central zone between coils 12, 14, 16 and 18, the magnetic flux lines are generally straight and moderately uniformly spaced. The line 42, $R_0Z_0$, as shown in FIG. 3, about which the magnetic field pattern rotates, is substantially mid-way between the four coils.

The average electromagnetic inductive potential is plotted in FIG. 5 in terms of equipotential lines. The numerical designations on the plot of FIG. 5 are in terms of millivolts per ampere squared. As discussed and analyzed mathematically in detail below, the electromagnetic induction potential applies a force on both positively and negatively charged particles in the direction of lower values of potential. As the potential has a minimum toward the center of the coil structure, the gas plasma tends to be "confined" or "trapped." The trap area is marked by a double line approximately at the ¾ millivolt per ampere squared level. It is interesting to note that the trap zone has a reduced potential level toward the outer circumference of the device between the coils 12 and 14. This is the zone where escape of ionized particles from the trap will occur. With this arrangement, high energy plasma may be ejected from the system radially when the potential barrier is less than the dynamic pressure of the gas enclosed within the trap. This may be accomplished by increasing the current applied to the coils or by other techniques discussed below. The gas plasma may be ejected parallel to the axis of the system by decreasing the spacing between coils 12 and 14 and increasing the spacing between coils 14 and 18, for example. This would have the effect of increasing the potential barrier at the outer periphery of the trap and reducing the barrier between coils 14 and 18.

Several interesting factors relating to the plot of FIG. 5 involve the arbitrary units for the radial and axial distance. In this connection, it may be noted that the plot is valid for any corresponding set of radial and axial distances. Thus, the coils could have any radius from a few millimeters to a mile, for example; as long as the relative spacing is maintained, the plot will be valid.

FIGS. 6 and 7 are plots relating to a similar geometry. In FIG. 6, the axis of symmetry is again the lower border of the figure. The six coils include coils 52 and 54, which are wound in series opposition, and four additional coils 56, 58, 60 and 62. The coils 56, 58, 60 and 62 are energized in series, with the coils 56 and 58 being wound in one direction and the coils 60 and 62 being wound in the opposite angular sense.

The magnetic flux pattern for the coils 52 and 54 only (with the other coils de-energized) is indicated by the solid line plots 64. Similarly, the flux resulting from coils 56, 58, 60 and 62 (with coils 52 and 54 de-energized) is indicated by the dashed line plots 66. The numbers pertaining to the solid and dashed lines indicate relative values of flux.

FIG. 7 is a plot of the average induced electromagnetic potential from the rotating magnetic field. This plot corresponds, for the six coil geometry shown in the figure, to FIG. 5 which relates to the four coil system.

FIG. 8 shows the average electromagnetic inductive potential plotted along two different straight lines passing through the annular line 68 at the center of the coil structure of FIG. 7. Thus, plot 70 is taken along line A—A and the dashed line plot 72 is taken along line B—B of FIG. 7. The center of the trap 68 appears between the peaks of both of the two inductive potential characteristics 70 and 72. In the plots of FIG. 8, the inductive potential plot 70 has maxima at 71 in the vicinity of coil turns 54 and at point 73 in the vicinity of coil turns 52. The characteristic 72 has somewhat lower maxima at points 75 and 77 on either side of the center of the trap 68. Points 75 and 77 are "saddle points" between the true three-dimensional maxima which appear close to the coils. Because the saddle point 77 is lower than saddle point 75, plasma will escape from the trap at this point and at a similar point between coil turns 52 and turn 56. The point 77 and its corresponding symmetrical saddle point may therefore be considered to be pouring spouts from which the plasma is ejected when the gas pressure and other outward forces within the well exceed the containing inductive potential.

FIG. 9 shows a portion of the coil structure of FIGS. 6 and 7. Specifically, FIG. 9 shows the outer two-turn coil 52 and the inner three-turn coil 54 together with the intercoupling loop 55 and the associated input leads. The loop 55 is bent into a plane extending parallel to the axis of the coil structure to minimize field effects on the trap geometry. The other coils 58, 60, 62 and 56 would, in actual practice, be interfitted with the coil structure shown in FIG. 9. The minimum inductive potential point of the annular trap would extend about the axis of the structure of FIG. 9 approximately mid-way between coils 52 and 54. The showing of FIG. 9 has been included to emphasize the fact that FIGS. 6 and 7, like certain other figures of the drawings, are cross-sectional views taken from one side only of the axis of the coil structure.

In the foregoing portion of this patent specification, certain general considerations relating to the invention have been set forth and FIGS. 1 through 9 have been discussed on a structural and qualitative basis. Before proceeding with the consideration of FIGS. 10 through 18 of the drawings, the underlying phenomena which are involved in the present invention will be considered from a theoretical standpoint.

THEORETICAL ANALYSIS

In the mathematical analysis of apparatus of the type described above in connection with FIGS. 1 through 4, it is useful to use a cylindrical coordinate system with unit vectors $$\hat{r}, \hat{z}, \text{ and } \hat{\theta}$$

A typical point having the position $r, z, \theta$ is shown in FIG. 3, in which the axis of symmetry at the lower edge of the figure corresponds to the zero value of "$r$", $r$ is measured from this axis, $z$ is measured along the axis, and $\theta$ is the angular position of a point about the axis. Another set of coordinates $\rho, \alpha, z$ will be used subsequently in this analysis. A magnetic field which has cylindrical symmetry is assumed to be present. This kind of symmetry is defined by restricting the vector potential, $\vec{A}$, of the magnetic field to have the following form:

$$\vec{A}(r, z, t) = \hat{\theta} A(r, z, t) \quad (1.1)$$

The magnetic flux which is included between the axis of symmetry ($r=0$) and a circle of radius $r$ and axial position $z$ is denoted by $\Phi(r, z, t)$.

$$\Phi(r, z, t) \equiv 2\pi \int_0^r dr\, r B_z(r, z, t) = 2\pi r A \quad (1.2)$$

In addition to the vector potential defined by Equation 1.1 a scalar potential, X, will be considered. This potential is assumed to describe the effects of the accumulation of charges on various parts of the system, and it will be restricted to have the following form:

$$X = X(r, z, t) \quad (1.3)$$

The various components of the magnetic field, B, and the electric field, E, can be computed in the following manner:

$$B_r = -\frac{1}{2\pi r} \frac{\partial \Phi}{\partial z} \quad (1.4)$$

$$B_z = \frac{1}{2\pi r} \frac{\partial \Phi}{\partial r} \quad (1.5)$$

$$E_r = -\frac{\partial x}{\partial r} \quad (1.6)$$

$$E_z = -\frac{\partial x}{\partial z} \quad (1.7)$$

$$E_\theta = -\frac{1}{2\pi r} \frac{\partial \Phi}{\partial t} \quad (1.8)$$

Consider two systems of stationary electrical conductors, such as the two sets of coils of FIGS. 1 through 4, which carry alternating current of the same frequency, but differing in phase by 90 electrical degrees. The flux in the space around the conductors may be represented by the following equation:

$$\Phi(r, z, t) = \Phi_1(r, z) \sin \omega t + \Phi_2(r, z) \cos \omega t \quad (1.9)$$

It follows from Equation 1.2 that the flux is zero along the axis of symmetry, but it may also be zero at other places within the region of interest. The particular type of flux-pattern which is the concern of this analysis is obtained by specifying that both $\Phi_1$ and $\Phi_2$ are zero (for all values of time) along the circumference of a circle lying within the region enclosed by the conductors. Specifically, it is assumed that:

$$\Phi_1(r_0, z_0, t) = \Phi_2(r_0, z_0, t) = 0 \quad (1.10)$$

Equation 1.9 may be rewritten in a more compact form through the use of the following definitions:

$$[\Phi_0(r, z)]^2 \equiv [\Phi_1(r, z)]^2 + [\Phi_2(r, z)]^2 \quad (1.11)$$

$$\gamma(r, z) \equiv \sin^{-1}\left[\frac{\Phi_2(r, z)}{\Phi_0(r, z)}\right] \quad (1.12)$$

The resulting form of Equation 1.9 is:

$$\Phi(r, z, t) = \Phi_0(r, z) \sin[\omega t + \gamma(r, z)] \quad (1.13)$$

with $\Phi = 0$ along the circle defined by $r = r_0$, $z = z_0$, as indicated in FIG. 3. Thus, Equation 1.13 represents a toroidal flux pattern which is undergoing a twisting, or "hineindrehen" type of motion about the circle $r = r_0$, $z = z_0$.

If the cyclotron frequency of a charged particle in the field is much smaller than $\omega$, the frequency applied to the conductors, then the particle cannot follow the field motions in detail, and its behavior will be determined by the time-averaged form of the field. The means square time-average of Equation 1.13 is:

$$\Phi(r, z)^2 = \tfrac{1}{2}[\Phi_0(r, z)]^2 \qquad (1.14)$$

The time-average force on the particle is such as to keep it in the vicinity of the circle along which $\Phi_0=0$ and one sees the possibility of trapping the particle indefinitely. The behavior of a plasma in such a trap will be considered below.

As mentioned above in some detail, FIGS. 3 and 4 show the flux pattern generated by four coils of wire excited by two-phase alternating current, with one phase shifted 90° from the other. The upper-right and lower-left coils are connected series-opposed and are excited by one of the phases. The upper-left and lower-right coils are also connected series-opposed and excited by the other phase. The pattern rotates in a counter-clockwise direction and the numbers associated with the curves are values of the flux (in arbitrary units). The arrows show the direction of the magnetic field and it is seen that where there is a change in the sign of the flux (which is a weighted integral given by Equation 1.2) there is no change in the direction of the field.

From studies of the situation with maximum current in one of the coil-sets and zero current in the other, it has been determined that the mutual inductance between the coil-sets is less than 5% of the self inductance of either set. Also, as noted previously, the center of rotation of the pattern is very close to the geometrical center of the array of coils.

Near the center of rotation the flux lines are about equally-spaced and a simple expression for $\Phi$ can be written. FIGURE 3 shows the coordinates ($\rho$, $\alpha$) that are used, and in terms of these, the flux is:

$$\Phi = 2\pi B r_0 \rho \sin\left(\omega t + \tfrac{\pi}{4} + \alpha\right) \qquad (1.15)$$

where B is the magnetic field generated at the center of rotation by eithe phase acting by itself. Thus, in this simple case, the flux pattern rotates about the point $\rho=0$ without change of shape, and the rotation occurs at angular speed $\omega$. In a more general case, the rotation is accompanied by changes in shape and the equation for flux is more complicated.

The equations of motion

Although we are interested in the behavior of a plasma, the simpler case of a single, isolated, particle of mass M and charge $q$ will be considered first. If $\vec{P}$ is the momentum of the particle then the equations of motion are derived from the following:

$$\frac{d\vec{P}}{dt} = q[\vec{v}\times\vec{B} + \vec{E}] \qquad (1.16)$$

where "$t$" represents time and "$v$" represents velocity. The electric field, $\vec{E}$, can arise from two sources:

(a) From induction; due to changes of $\vec{B}$ with time. This type of field will be termed the "inductive" electric field. Because of the assumed symmetry there is an inductive electric field in the azimuthal direction only.

(b) From charges; due to slight spatial separations of ions from electrons when a plasma is present, or due to charge-accumulation on various parts of the current-carrying conductors. This type of field will be termed the "capacitive" electric field. Because of the assumed symmetry there is no capacitive electric field in the azimuthal direction.

When the fields have the type of symmetry which has been assumed (see Equations 1.1 and 1.3) then both the capacitive and inductive effects can be described by scalar potentials. The method of doing this will be described in the following paragraphs.

Consider a cartesian coordinate system with radial position as the ordinate and axial position as the abscissa. The unit vectors are taken to be $\hat{a}_r$ and $\hat{a}_z$ and the vector position of the particle, S, is:

$$\vec{S} = \hat{a}_r r + \hat{a}_z z \qquad (1.17)$$

The half-plane corresponding to positive values of $r$ is the only part of the coordinate system which is used and if, in the course of the particle's motion, it reaches the $r=0$ axis then it is assumed to reflect from this axis like a light ray (i.e. equal angles of incidence and reflection) The momentum of the particle, $\vec{Q}$, is:

$$\vec{Q} = \hat{a}_r P_r + \hat{a}_z P_z = M(\hat{a}_r \dot{r} + \hat{a}_z \dot{z}) \qquad (1.18)$$

Later-on two gradient operators will be needed. They are:

$$\nabla_S = \hat{a}_r \frac{\partial}{\partial r} + \hat{a}_z \frac{\partial}{\partial z} \qquad (1.19)$$

$$\nabla_Q = \hat{a}_r \frac{\partial}{\partial P_r} + \hat{a}_z \frac{\partial}{\partial P_z} \qquad (1.20)$$

The equations of motion of the particle, expressed in terms of the coordinate system described above, can be shown to be the following:

$$\frac{d\vec{Q}}{dt} = -q\nabla_S(V+X) \qquad (1.21)$$

where X is the "capacitive" potential (see Equation 1.3), and V is a potential which describes the effects of the magnetic field. Inasmuch as V implicitly contains the effects of induction, it is termed the "inductive" potential. Like X, it is a scalar quantity.

The defining equation for V is:

$$V = \frac{q}{8\pi^2 M}\left[\frac{\Phi(r, z, t) - K}{r}\right]^2 \qquad (1.22)$$

where K is a constant whose meaning will be discussed in subsequent paragraphs. The sign of V is always the same as the sign of $q$ and both V and its gradient are zero when the particle is at a position where $\Phi=K$. The unit of V is one volt.

Discussion of constant K

Suppose that at time $t=t_a$ the particle is at position $r=r_a$, $z=z_a$ and has angular momentum (with respect to the axis of symmetry) of $J(a)$. The flux at the position of the particle is similarly denoted by $\Phi(a)$. Then K has the following value:

$$K = \Phi(a) + \frac{2\pi J(a)}{q} \qquad (1.23)$$

and it is a constant of the motion. The angular momentum at any subsequent time is therefore equal to:

$$J(r, z, t) = -\frac{q}{2\pi}[\Phi(r, z, t) - K] \qquad (1.24)$$

Consider any one of the following events:

(1) The particle moves to a position in the field where the flux is locally, or instantaneously, zero.

(2) The particle escapes from the geometry and moves so far away from the current-carrying coils that the flux is zero.

(3) The entire field is reduced to zero-value in some arbitrary fashion.

In each of these cases the resultant angular momentum of the particle is:

$$\frac{q}{2\pi} K \equiv J_0 \qquad (1.25)$$

$J_0$ will subsequently be referred to as the "trapped" angular momentum. Similarly, K can be termed the "trapped" flux.

The azimuthal position of the particle (which does not appear in the above formalism) can be found by integrating Equation 1.24. By comparing Equations 1.22 and 1.24, one can show that V is numerically equal to the kinetic energy of the particle in the azimuthal direction. This is true regardless of the time dependence of $\Phi$.

*Motion within a plasma*

So far, the motion of a single isolated particle has been described. When many particles are present, as in a plasma, a number of important modifications must be made. These will now be discussed.

First of all, there will be forces on the particles in addition to those (see restrictions (a) and (b) which follow Equation 1.16) which were taken into account already. These additional forces arise because of inter-particle collisions, and it is no longer valid to consider K to be constant. If $$F_\theta^c$$

denotes the component of these collisional forces in the azimuthal direction then Equation 1.23 must be replaced by the following equation:

$$K(t) = \Phi(a) + \frac{2\pi}{q}\left[J(a) + \int_{t_a}^{t} rF_\theta^c dt\right] \quad (1.26)$$

Additional forces, due to collisions, will also appear in the radial and axial directions. The problem of accounting for the effects of collisions is greatly complicated, compared to ordinary kinetic theory, by the fact that the dominating effects are those due to Coulomb encounters. The long-range nature of the Coulomb encounters results in frequent small-angle deflections, and relatively less frequent large-angle deflections. Nevertheless, if the conditions of density and temperature are suitable, the behavior of the plasma is not overwhelmingly dominated by collisions, and essential features of the behavior can be predicted using a simplified treatment of collisions. A rough classification of collisional effects can be made, and the analysis can proceed from this basis. The classification which is used here is the following:

A. *Two-particle interactions.*—Large-angle scattering events occur as a result of close encounters and are therefore relatively infrequent. They may be included within the present formalism by treating the scattering forces as a series of isolated, impulsive events; with due account being taken of possible changes of kinetic energy. Small-angle scattering events are limited by the shielding action of the plasma as expressed by the concept of Debye length. The process is in many ways similar to the multiple scattering of electrons as they penetrate into a dense material. Gross angular deflection occurs as a result of the statistical compounding of many small deflections and the RMS deflection is roughly proportional to the square-root of the number of scattering centers encountered.

B. *Many-particle interactions.*—A plasma has a strong tendency to maintain charge-neutrality. If externally-applied forces try to separate the ions from the electrons then space-charge voltages develop which prevent the separation from continuing. At densities and temperatures which are of interest in laboratory experiments, the electron-ion unbalance is always very slight. From the viewpoint of a single ion or electron, the neutralizing forces represent an interaction with many other particles simultaneously. Since many particles are involved, the short-term, statistical fluctuations will be negligible and the forces may be conveniently described in terms of a scalar potential, such as X (see Equation 1.21).

When many particles are present, as in a plasma, the motion of the particles under the action of the applied fields may result in the flow of current. This current gives rise to its own fields, and these contribute to $\Phi$. The flux which appears in Equation 1.22 is the sum of the flux resulting from the applied field and that due to the self-field of the plasma. Since flux is a scalar quantity, simple addition of the two contributions is possible. The self-flux gives rise to gross collective effects in the plasma; such as the "pinch." The basic behavior of the plasma in the applied field may also be modified when the collective effects become dominant.

Finally, since both ions and electrons are present, equations like 1.21 must be written for each constituent and X must be chosen so that gross charge-neutrality is preserved.

In the following sections, an attempt is made to determine the time-average behavior of a plasma in the presence of a magnetic field of the type described by Equation 1.13. In order to do this, a Boltzmann equation is employed in conjunction with the equations of motion which have already been discussed.

*The Boltzmann equation*

A two-dimensional Boltzmann equation will be written for each of the constituents of the plasma. For simplicity the following discussion is restricted to the general case of a particle of mass M and charge $q$. A distribution function, $f$, is used to describe the probability of finding the particle at a given place in space with a given motion. The parameters which are required to describe the particle are: the spatial coordinates, $r$ and $z$; the momentum components, $P_r$ and $P_z$; the trapped flux, K; and the time, $t$. In the present formalism, the trapped flux is regarded as a "hidden" parameter and is treated like a parameter which would describe the internal spin or vibration state of a molecule.

The two-dimensional Boltzmann equation is developed in a manner entirely analogous to the usual three-dimensional development. The forces involved have already been shown to be described in terms of scalar potentials which do not depend on either $P_r$ or $P_z$, the momentum in the axial or radial directions. Use is also made of Equation 1.20. The Boltzmann equation is:

$$\frac{\partial f}{\partial t} + \frac{\vec{Q}}{M}\cdot\nabla_s f - q\nabla_s(V+X)\cdot\nabla_Q f = \frac{\partial f}{\partial t}\bigg)_c \quad (1.27)$$

where the distribution function, $f$, is defined as follows:

$$fdSdQdK \equiv f(r,z,P_r,P_z,K,t)\ drdzdP_rdP_zdK \quad (1.28)$$

The term on the right-hand side of Equation 1.27 represents the effects of two-particle collisions, and X includes the effects of many-particle neutralizing forces.

If V, X, and $f$ are time independent, the solution of Equation 1.27 is:

$$f \sim e^{-F} \quad (1.29)$$

where:

$$F = \frac{3}{2E_T}\left[\frac{\vec{Q}\cdot\vec{Q}}{2Me} + \frac{q^2}{8\pi^2 Me}\left(\frac{\Phi-K}{r}\right)^2 + \frac{qX}{e}\right] \quad (1.30)$$

$E_T$ is the root mean square average kinetic energy (in electron volts) of the particles due to thermal motions, and $e$ is the absolute value of the charge of an electron. $E_T$ is related to the absolute temperature, T, in degrees Kelvin, in the following way:

$$E_T = \frac{3kT}{2e} = \frac{T}{7740} \quad (1.31)$$

where $k$ is the Boltzmann constant. In the following discussions, $E_T$ and T will be used in an interchangeable fashion.

The time-independent solution which has been written is not physically realizable due to effects which must exist at the boundaries of the plasma. However, the essential features of the plasma can be made clear through its use.

The following average values are computed with the aid of the distribution function:

$$\langle K \rangle = \Phi(r,z) \quad (1.32)$$

$$\left\langle \left(\frac{K}{r}\right)^2 \right\rangle = \left(\frac{\Phi(r,z)}{r}\right)^2 + \frac{8\pi^2 Me}{q^2}\left(\frac{E_T}{3}\right) \quad (1.33)$$

Equation 1.32 expresses the fact that each particle is gyrating locally about a field line. This condition is brought about by the randomizing effects of collisions, and the plasma may be described as being totally "imbedded" in the field.

The two-dimensional density, $n$ $(r, z)$, is found to be:

$$n(r,z) \equiv \int\int f dQ dk \sim r e^{-\left(\frac{3qX}{2eE_T}\right)} \quad (1.34)$$

The conventional three-dimensional density may be found by dividing $n$ by $2\pi r$. It is seen that the density is controlled by the temperature and by X.

The above results, together with Equation 1.24, can be used to find the following information about the momentum components $P_r$ and $P_z$, and the angular momentum, J:

$$\langle P_r \rangle = \langle P_z \rangle = \langle J \rangle = 0 \quad (1.35)$$

$$\langle P_r^2 \rangle = \langle P_z^2 \rangle = \left\langle \left(\frac{J}{r}\right)^2 \right\rangle = 2Me\left(\frac{E_T}{3}\right) \quad (1.36)$$

The currents which flow are proportional to the average values of the various components of momentum, and according to Equation 1.35 these are all zero. Thus, no currents flow. This result is independent of the magnitude of X. If one examined the particle motion in detail, the various particles would be found to be undergoing $E \times B$ drifts in the azimuthal direction, and one might be tempted to conclude that there is a current flow. Evidently the $E \times B$ drifts are exactly annulled by the density variations. Similar results hold for other geometries.

The behavior of a plasma in a dynamic trap will be examined in subsequent sections and the results will be found to be quite different from those which hold for static fields. In particular, it will be found that the conditions for efficient trapping are also the conditions for no "imbedding" in the magnetic field, where "imbedding" implies that the particles move with the field pattern as though stuck to it. Thus, Equation 1.32 will become the following:

$$\langle K \rangle = 0 \quad (1.37)$$

for both the ions and the electrons. Equations 1.35 and 1.36 together imply that the dispersion of the various momentum components is governed only by the temperature. This result will be found to be still valid for the case of the dynamic trap.

The dynamic plasma trap

When the magnetic field changes with time each flux contour moves with a speed and direction which is governed by the local "drift velocity." If this motion is very slow, the particles will be able to follow faithfully and a distribution which is very close to that for the static case will apply. On the other hand, for more rapid motions the distribution is radically changed and the plasma is no longer completely "imbedded" in the field. The driving frequency plays a very important role in determining whether imbedding takes place and, in the case of the dynamic trap, whether any trapping action occurs.

Equation 1.13 describes the type of field to be considered in connection with the dynamic trap. If the driving frequency is very high, then neither electrons nor ions will be able to follow the instantaneous field configurations and the resultant motion will be determined by the time-average characteristics. The forces which act on a particle will be in such a direction as to attempt to move the particle towards a position where $V=0$. However, before the particle can respond, the field configuration will have changed. As a result, the particle will be trapped by the field and forced to remain close to the point $r=r_0$, $z=z_0$ (i.e. the point which lies at the center of the convoluting or "hineindrehen" motion). Trapping will occur provided the total kinetic energy of the particle is not so high that the magnetic forces can be completely overridden.

The condition for the type of trapping described above can be written in terms of the average cyclotron frequency experienced by the electrons, $$\overline{\omega_c^e}$$

and the average cyclotron frequency experienced by the ions, $$\overline{\omega_c^i}$$

The condition is:

$$\omega \gg \overline{\omega_c^e} \gg \overline{\omega_c^i} \quad (1.38)$$

There will always be some losses from the trap since it is of finite depth. Collision processes will result in the accumulation of relatively large amounts of kinetic energy on a few particles, and these may acquire enough energy to overcome the magnetic forces. In order to keep the system in an equilibrium condition, new un-ionized material must be continually introduced. This material will subsequently become ionized and heated and will eventually escape. If the trap is several tens-of-volts deep, then it is likely that a high degree of ionization will be achieved in the trap and the collisions will be predominantly Coulomb collisions. The collision rates may be much lower than the frequency of the applied field since high temperatures may be achieved, and the particles in the trap will have a "memory" which extends over many cycles.

It is believed that trapping can occur for frequencies which are considerably lower than those described by Equation 1.38. In particular, the following frequency range is of interest:

$$\overline{\omega_c^e} > \omega \gg \overline{\omega_c^i} \quad (1.39)$$

The analysis will assume that the frequency lies in the above range. The ions still cannot follow the instantaneous urgings of the magnetic field, but electrons can move about rather rapidly and may criss-cross the geometry many times during one cycle of the field. There are still stringent restrictions imposed on the electrons, however, for the motion must be such as to preserve charge-neutrality at all locations.

The electrons are taken to have mass $m$ and charge $-e$ and the ions are taken to have mass $M$ and charge $+e$. Superscripts $e$ and $i$ will be used to denote quantities pertaining to the electrons and the ions, respectively. A bracket notation will be used to denote quantities which are average values computed with the aid of the distribution functions. An over-line (for example: $\overline{X}$) will be used to denote the time-average of a quantity taken over one period of the applied field. The primary assumptions of the analysis are stated below:

(1) Both the ions and the electrons are, on the average, trapped for a time which is long compared to one period of the applied field.

(2) The conditions which are reached in the trap are such that the collision frequency is small compared to the frequency of the applied field.

(3) The frequency of the applied field is so high that the ions move very little during one period.

(4) The distribution functions are periodic functions of time with a period equal to, or less than, the period of the applied field. The magnitude of this time-dependence may be small, however.

(5) The density of the ions and the electrons is equal at all positions and at all times.

(6) The net angular momentum of the plasma with respect to the axis of symmetry is zero at all positions and times.

Assumptions 1 through 5 will be satisfied if the field strength, the frequency, and the plasma density are adjusted properly. However, assumption 6 is not so easily justified as it involves the detailed behavior of the plasma.

It will be seen that assumption 6 plays a very important role in the analysis, and the theoretical predictions depend on its use in the first order. Experimental verification of the predictions will thus serve to test the validity of assumption 6.

The six assumptions, together with the Boltzmann equation, are sufficient to determine the time-average value of X and the time-average values of the distribution functions. No information more detailed than this can be obtained. The trapped flux, K, plays a central role and it is useful to recall Equation 1.26 at this time. That equation indicates that the distribution of K-values is governed by the collision forces which the particles experience.

In the static-field example, it was found that the dispersion of K-values depends only on temperature, and the same result will be found to hold for the case of the magnetic trap.

In the static-field example, the mean value of K was found to be equal to the value of the flux experienced by the particles. Since the field at a given position in the magnetic trap alternates with time, the mean value of K must involve some sort of average over the values of flux that the particles experience, and the average must involve a span of time equal to several collision times.

The distribution function for the ions can be written as a sum of functions which have definite symmetry with respect to the trapped flux, $K^i$.

$$f^i = A_0^i(\ldots, K^i) + A_1^i(\ldots, K^i, t) + B_0^i(\ldots, K^i) + B_1^i(\ldots, K^i, t) \quad (1.40)$$

The functions $A_0^i$ and $A_1^i$ are assumed to be even functions of $K^i$, and $B_0^i$ and $B_1^i$ to be odd functions of $K^i$. The time dependence is contained in $A_1^i$ and $B_1^i$. For simplicity the variable $r$, $z$, $P_r$, and $P_z$ have been dropped in writing Equation 1.40. To compute the ion density, one must integrate $f^i$ over all values of $P_r$, $P_z$, and $K^i$ and when this is done the terms expressed by $B_0^i$ and $B_1^i$ give no contribution since they are odd functions of $K^i$. Thus the process of computing density gives no information about the relative size of these terms with respect to the $A_0^i$ term. However, since the density is a very weak function of time (by assumption 3) one can reasonably conclude that:

$$A_1^i(\ldots, K^i, t) \ll A_0^i(\ldots, K^i) \quad (1.41)$$

The ions move very little during one period of the applied field and so their position is in no way synchronized with the field. In addition, the mean collision time is long compared to one period. For these two reasons there can be no collision processes which, on the average, favor positive values of $K^i$ over negative ones and one must conclude that the distribution function, $f^i$, is an even function of $K^i$. Therefore we take:

$$B_0^i(\ldots, K^i) = B_1^i(\ldots, K^i, t) = 0 \quad (1.42)$$

Using the above information, along with Equations 1.13 and 1.24, it is possible to compute the average angular momentum of the ions. The result is:

$$\langle J^i \rangle = -\frac{e}{2\pi}[\Phi_0(r, z) \sin(\omega t + \gamma(r, z))] \quad (1.43)$$

The distribution function for the electrons can also be written as a sum of functions which have definite symmetry with respect to the trapped flux:

$$f^e = A_0^e(\ldots, K^e) + A_1^e(\ldots, K^e, t) + B_0^e(\ldots, K^e) + B_1^e(\ldots, K^e, t) \quad (1.44)$$

Since the electrons are capable of moving a great deal during one period of the applied field, one cannot conclude that $f^e$ is an even function of $K^e$ in the same manner as was done for the ions. However, since the density is a very weak function of time for the electrons (by assumptions 3 and 5), one can conclude, in analogy to Equation 1.41, that:

$$A_1^e(\ldots, K^e, t) \ll A_0^e(\ldots, K^e) \quad (1.45)$$

The average value for the angular momentum of the electrons is found to be:

$$\langle J^e \rangle = \frac{e}{2\pi}[\Phi_0(r, z) \sin(\omega t + \gamma(r, z)) = \langle K^e \rangle] \quad (1.46)$$

where $\langle K^e \rangle$ depends on the values of $B_0^e$ and $B_1^e$. The sum of Equations 1.43 and 1.46 gives the total angular momentum of the plasma.

$$\langle J^i \rangle + \langle J^e \rangle = -\frac{e}{2\pi}\langle K^e \rangle \quad (1.47)$$

This result is at variance with assumption 6 unless $\langle K^e \rangle$ vanishes, and that can only happen if:

$$B_1^e(\ldots, K^e, t) = B_0^e(\ldots, K^e) = 0 \quad (1.48)$$

From the above results, one concludes the electron motion is not synchronized with the field, and that the electrons (at any given position and time) have, on the average, experienced all phases of the applied field during a period of time encompassing several collision times.

The time-averaged values of $f^i$ and $f^e$ can now be determined. The development proceeds in an identical manner for both and only the ion case will be discussed in detail. The collision term may be dropped from the Boltzmann equation by assumption 2, and Equation 1.41 allows one to drop the terms in $A_1^i$ at several places. The result is:

$$\frac{\partial A_1^i}{\partial t} + \frac{\vec{Q}}{M} \cdot \nabla_s A_0^i - e\nabla_s[V^i + X] \cdot \nabla_Q A_0^i = 0 \quad (1.49)$$

The equation is now averaged over a length of time equal to one cycle of the applied field and, by assumption 4, the term in $A_1^i$ drops out. Equation 1.13 is used for the flux, and the time average of X is denoted by $\overline{X}$. The result is:

$$\frac{\vec{Q}}{M} \cdot \nabla_s A_0^i - e\nabla_s\left[\frac{e}{8\pi^2 M}\left(\frac{\frac{1}{2}\Phi_0^2 + K^{i2}}{r^2}\right) + \overline{X}\right] \cdot \nabla_Q A_0^i = 0 \quad (1.50)$$

The above equation is identical in form to the equation which describes the behavior of a gas in a gravitational field when the gas is in thermal equilibrium. If the ion temperature is denoted by $E_T^i$ (actually the temperature-energy) then the solution of Equation 1.50 which is invariant to collisions is:

$$\overline{f^i} = A_0^i \sim e^{-F^i} \quad (1.51)$$

where:

$$F^i = \frac{3}{2E_T^i}\left[\frac{P_r^2 + P_z^2}{2Me} + \frac{e}{8\pi^2 M}\frac{1}{r^2}\left(\frac{1}{2}\Phi_0^2 + K^{i2}\right) + \overline{X}\right] \quad (1.52)$$

In a similar way, the distribution function for the electrons is found to be:

$$\overline{f^e} = A_0^e \sim e^{-F^e} \quad (1.53)$$

where:

$$F^e = \frac{3}{2E_T^e}\left[\frac{P_r^2 + P_z^2}{2Me} + \frac{e}{8\pi^2 M}\frac{1}{r^2}\left(\frac{1}{2}\Phi_0^2 + K^{e2}\right) - \overline{X}\right] \quad (1.54)$$

The electron temperature, $E_T^e$, will in general be different from the ion temperature, $E_T^i$. One must remember that strict thermal equilibrium is never obtained in the trap due to the various trap loss mechanisms which will occur. The temperatures may rise sufficiently high that collisions are effectively halted before the ions and the electrons come into equilibrium with each other.

The above results can be used to compute the time-averaged mean values of the three components of momentum and their dispersion. These values do not depend on a knowledge of $\bar{X}$.

For the ions:

$$\langle \bar{P_r} \rangle = \langle \bar{P_z} \rangle = \langle \bar{J} \rangle = 0 \quad (1.55)$$

$$\overline{\langle P_r^2 \rangle - \langle P_r \rangle^2} = \overline{\langle P_z^2 \rangle - \langle P_z \rangle^2} = \overline{\langle J^2 \rangle - \langle J \rangle^2} = 2Me\left(\frac{E_T^i}{3}\right) \quad (1.56)$$

For the electrons:

$$\langle \bar{P_r} \rangle = \langle \bar{P_z} \rangle = \langle \bar{J} \rangle = 0 \quad (1.57)$$

$$\overline{\langle P_r^2 \rangle - \langle P_r \rangle^2} = \overline{\langle P_z^2 \rangle - \langle P_z \rangle^2} = \overline{\langle J^2 \rangle - \langle J \rangle^2} = 2me\left(\frac{E_T^e}{3}\right) \quad (1.58)$$

In order to preserve charge neutrality, the density of ions and electrons must be equal and so the following equation must hold:

$$\iiint \bar{f}^i dP_r dP_z dK^i = \iiint \bar{f}^e dP_r dP_z dK^e \quad (1.59)$$

When the distribution functions are used in Equation 1.59 and integrations are performed, it is found that $\bar{X}$ must be equal to the following:

$$\bar{X} = \frac{E_T^i M - E_T^e m}{mM(E_T^i + E_T^e)}\left(\frac{e}{16\pi 2}\right)\left(\frac{\Phi_0(r,z)}{r}\right)^2 \quad (1.60)$$

The two-dimensional density of ions and electrons can now be computed and the result is found to be the following:

$$n^e(r,z) = n^i(r,z) \sim re^{-G} \quad (1.61)$$

where:

$$G = \left(\frac{3}{2(E_T^i + E_T^e)}\right)\left(\frac{e}{16\pi^2}\frac{mM}{m+M}\right)\left(\frac{\Phi_0(r,z)}{r}\right)^2 \quad (1.62)$$

In order to get a better idea of the meaning of these results, we make use of the simple expression for the flux which was written as Equation 1.15, and also neglect $m$ in comparison to $M$. Then the above equation becomes:

$$G = \frac{3e}{8m(E_T^i + E_T^e)}\left(\frac{Br_0\rho}{r}\right)^2 \quad (1.63)$$

If the cyclotron gyro-radius for the electrons in the field B is denoted by $\rho_c^e$ then Equation 1.64 can be written as follows:

$$G = \frac{3E_T^e}{4(E_T^c + E_T^e)}\left(\frac{r_0\rho}{r\rho_c^e}\right)^2 \quad (1.64)$$

This equation gives the result that the density of particles drops off sharply as the distance from the center of the hineindrehen rotation becomes large compared to an electron gyro-radius.

Equations 1.60, 1.61, and 1.62 are important results of the theoretical analysis as they describe the action of the dynamic trap. A close connection exists between the functions $\bar{X}$ and G and the "inductive" potential which was used, as described earlier, in the construction of FIGS. 5, 7, 8, 12 and 13. This connection is established in the following paragraphs.

The mass of an ion is much larger than the mass of an electron, so that it is a good approximation to specify $M \gg m$ in the equations which have been developed. Then, in place of Equation 1.60, the following equation can be written:

$$\bar{X} = \left[\frac{E_T^i}{E_T^i + E_T^e}\right]\left[\frac{e}{16\pi^2 m}\left(\frac{\Phi_0(r,z)}{r}\right)^2\right] \quad (1.65)$$

Through the use of Equation 1.11, $\bar{X}$ can be written in a still different way, and, in addition, if one sets $E_T^i = E_T^e$ then:

$$\bar{X} = \frac{e}{32\pi^2 m}\left[\left(\frac{\Phi 1}{r}\right)^2 + \left(\frac{\Phi 2}{r}\right)^2\right] \quad (1.66)$$

Consider now the time-average value of the "inductive" potential for an electron whose motion is such that the value of "trapped" flux, $K^e$, is zero. The quantity will be denoted by $\overline{V^e(K^e=0)}$. Through the use of Equations 1.13, 1.14, and 1.22 a value for $\overline{V^e(K^e=0)}$ can be determined, and a comparison of the result with Equation 1.65 reveals the following identity:

$$\bar{X} = -\left[\frac{E_T^i}{E_T^i + E_T^e}\right][\overline{V^e(K^e=0)}] \quad (1.67)$$

Thus, the close connection between $\bar{X}$ (and hence G) and the "inductive" potential has been demonstrated. The ions are so massive that their motion is determined by time-average values of the potentials, and not instantaneous values. Equation 1.21 indicates that the two potentials of influence are $\bar{V}^i$ and $\bar{X}$. However, $\bar{V}^i$ is proportional to $1/M$ and $\bar{X}$ is proportional to $1/m$. Since M and $m$ are so disproportionate in value, it is clear that, of the two potentials, $\bar{X}$ is of overwhelming significance. Consequenly, the ion motion can be studied by consideration of $\bar{X}$ alone. In accord with this, FIGS. 5, 7, 8, 12 and 13 were constructed from computed values of $\bar{X}$, using the particular form of $\bar{X}$ given by Equation 1.66.

MICROWAVE STRUCTURES

The present invention has been described up to this point in terms of various embodiments of the invention in which different arrangements of coils were employed. These configurations have now been analyzed on a theoretical and mathematical basis. Consideration will now be directed to embodiments of the invention utilizing microwave techniques.

In accordance with the foregoing discussion, it may be seen that a toroidal potential well can be formed by a set of coaxial coils. For higher frequency applications, a rotating magnetic field which produces a toroidal potential well can also be obtained by the superposition of two electromagnetic modes in time quadrature within a cylindrical resonant cavity. The modes in question are known as the $TE_{012}$ and the $TE_{021}$. These are the transverse electric modes shown in FIGS. 10 and 11, respectively. In the $TE_{021}$ mode designation, the "0" means that the configuration in the annular sense is unvarying. The second subscript refers to the number of patterns in the radial direction, while the final subscript refers to the modes in the longitudinal or z direction. As seen in FIGS. 10 and 11, the $TE_{021}$ mode has two concentric radial loops of magnetic field, while the $TE_{012}$ mode has two substantially identical coaxial loop configurations side by side. When these two field patterns are superposed and energized in time quadrature, circular polarization will occur.

The configuration of the $TE_{012}$ and $TE_{021}$ modes are shown in the diagrams of FIGS. 10 and 11, respectively. In these figures, the cylindrical surface of the cavity is represented by the surface 102 and the two flat, circular ends of the cavity are designated 104 and 106. The annular line "P," shown as two points P in FIGS. 10 and 11, is located at a maximum magnetic field strength point between the two sets of closed magnetic field loops for both of the two electromagnetic standing wave patterns. When the $TE_{012}$ and $TE_{021}$ modes are excited in phase quadrature within the cavity, the magnetic field H at "P" will be circularly polarized, as indicated by the rotating vector 108 as seen in FIGS. 10 and 11. In FIG. 10, in which the $TE_{021}$ mode is present and the $TE_{012}$ mode is at a zero intensity level, the voltage vector 108 is pointing to the left. In FIG. 11, with the $TE_{012}$ mode predominating, the vector 108 is pointing downwardly. In the successive time intervals corresponding to one-quarter of the period of the electromagnetic waves, the vector will rotate through additional 90° increments corresponding to a reversal of the direction of the field arrows of FIGS. 10 and 11, respectively.

For brevity, we shall indicate quantities pertaining to the mode $TE_{012}$ by the subscript 1 and those of the mode $TE_{021}$ by the subscript 2. Circular polarization in all axial planes can be obtained if the resonance is degenerate with respect to these modes. This condition can be insured by proper choice of the radius "$a$" and the length Z of the cylindrical cavity. We must have for resonance:

$$\lambda_{g2}/2 = \lambda_{g1} = Z \qquad (2.1)$$

$$\lambda_0/2\sqrt{1-(\lambda_0/\lambda_{c2})^2} = \lambda_0/\sqrt{1-(\lambda_0/\lambda_{c1})^2} \qquad (2.2)$$

where $\lambda_{g1}$ and $\lambda_{g2}$ are the wave lengths of the electromagnetic waves associated with the $TE_{012}$ and $TE_{021}$ modes, respectively. The subscript "$g$" implies "guide" or "waveguide" wave length as contrasted with $\lambda_0$ which is the free space wave length, and $\lambda_c$ which is the cutoff wave length, but $$\lambda_{c2} = 0.8955a, \quad \lambda_{c1} = 1.6396a \qquad (2.3)$$

and with a series of straightforward algebraic manipulations we obtain $$\lambda_0 = \frac{\sqrt{3}(1.6396)(0.4477)}{\sqrt{-0.4477^2 + 1.6396^2}} a = 0.8097a \qquad (2.4)$$

$$Z = \frac{\sqrt{3}(1.6396)(0.4477)}{\sqrt{1.6396^2 - 4(0.4477)^2}} a = 9.9279a \qquad (2.5)$$

The foregoing expressions 2.4 and 2.5 therefore establish the relationships between the wave length and thus the frequency of operation, the radius and the length of the cavity.

The filed components of a $TE_{01}$ wave propagating in the $+z$ direction are $$H_{z1}^{(+)} = A_1 J_0(K_{c1}r) e^{j\omega t - j2\pi z/\lambda_{g1}}$$
$$H_\Theta = 0 \qquad (2.6)$$

$$H_{r1}^{(+)} = j\frac{\lambda_c}{\lambda_{g1}} A_1 J_1(K_{c1}r) e^{j\omega t - j2\pi z/\lambda_{g1}}$$
$$E_z = 0 \qquad (2.7)$$

$$E_\sigma^{(+)} = j\eta A_1 J_1(K_{c1}r) e^{j\omega t - j2\pi z/\lambda_{g1}}$$
$$E_r = 0 \qquad (2.8)$$

$$\eta = \sqrt{\mu/\epsilon} = 376.73 \qquad (2.9)$$

H is magnetic field
$\theta$, $r$ and $z$ are conventional cylindrical coordinates
$J_0$, $J_1$ are Bessel functions
$t$ represents time
A represents amplitude
K is a constant, $K = 2\pi/\lambda$, $K_c = 2\pi/\lambda_c$
$\eta$ is the intrinisc impedance of space (376.73 ohms)
$\mu$ is the permetivity of space ($1.257 \times 10^{-6}$ Henrys/meter)
$\epsilon$ is the dielectric constant of space ($8.85 \times 10^{-12}$ farads/meter)

In passing, is should be noted that the Bessel function notation $J_0$, $J_1$ and so forth, employed in the present 2.0 series of equations is to be distinguised from the J representing angular momentum employed in Equation 1.35 and other equations in the 1.0 series.

The fields in the resonant cavity result from the superposition of fields propagating in the $+z$ direction and identical fields propagating in the $-z$ direction. The latter are identical to 2.6, 2.7, and 2.8 except for the sign of the propagation constant (reflected in the sign of 2.7).

$$H_{z1}^{(-)} = A_1 J_0(K_{c1}r) e^{j\omega t + j2\pi z/\lambda_{g1} + \varphi} \qquad (2.10)$$

$$H_{r1}^{(-)} = j\frac{\lambda_{c1}}{\lambda_{g1}} A_1 J_1(K_{c1}r) e^{j\omega t + j2\pi z/\lambda_{g1} + \varphi} \qquad (2.11)$$

$$E\sigma = j\eta A_1 J_1(K_{c1}r) e^{j\omega t + j2\pi z/\lambda_g + \varphi} \qquad (2.12)$$

where $\varphi$ is an arbitrary phase angle which may be adjusted to meet the boundary conditions at the end plates of the cavity. In particular, if end plates are located at $z=0$ and $z=Z$ (see FIG. 1), $\varphi = j\pi$.

Under these conditions, changing from the exponential notation to circular functions, we have $$H_{z1} = H_{z1}^{(+)} + H_{z1}^{(-)} = 2A_1 J_0(K_{c1}r) \sin \omega t \sin 2\pi z/\lambda_{g1} \qquad (2.13)$$

$$H_{r1} = -2A_1 \frac{\lambda_{c1}}{\lambda_{g1}} J_1(K_{c1}r) \sin \omega t \cos 2\pi z/\lambda_{g1} \qquad (2.14)$$

$$E_\Theta = -2\eta A_1 J_1(K_{c1}r) \cos \omega t \sin 2\pi z/\lambda_{g1} \qquad (2.15)$$

If we substitute now the values for $\lambda_0$, $\lambda_c$ and $\lambda_g$ from 2.1, 2.3 and 2.5 we have $$H_{z1} = 2A_1 J_0 (3.8322r/a) \sin \omega t \sin 2\pi z/Z \qquad (2.16)$$

$$H_{r1} = -2A_1 (1.7670) J_1 (3.8322r/a) \sin \omega t \cos 2\pi z/Z \qquad (2.17)$$

$$E\delta_1 = -2A_1 (376.73) J_1 (3.8322 r/a) \cos \omega t \sin 2\pi z/Z \qquad (2.18)$$

Similarly for the $TE_{021}$ mode:

$$H_{z2} = 2A_2 J_0 (7.0164 r/a) \sin (\omega t + \psi) \sin \pi z/Z \qquad (2.19)$$

$$H_{r2} = -2A_2 (0.4825) J_1 (7.0164r/a) \sin (\omega t + \psi) \cos \pi z/Z \qquad (2.20)$$

$$E_{\theta 2} = -2A_2 (376.74) J_1 (7.0164r/a) \cos (\omega t + \psi) \sin \pi z/Z \qquad (2.21)$$

where $\psi$ is the phase angle between the two fields; for circular polarization $$\psi = \pm \pi/2 \qquad (2.22)$$

depending on the direction of rotation.

The surface of zero flux for the $TE_{012}$ mode obviously is the plane $z = Z/2$. For the $TE_{021}$ it is the cylinder located at $$r_0 = \frac{3.8322}{7.0164} a = 0.54618a$$

If we stipulate the condition that $$H_{r1} = H_{z2} \mid_{z = Z/2, r = r_0} \qquad (2.23)$$

for obtaining circular polarization at this point, we obtain a relationship between the amplitudes $A_1$ and $A_2$:

$$2A_1 (1.7670) J_1 \frac{(3.8322)^2}{7.0164} = 2A_2 J_0 (3.8322) \qquad (2.24)$$

$$A_2 + 2.4839 A_1 \qquad (2.25)$$

If we introduce a new constant $$A_1 = \tfrac{1}{2} A \qquad (2.26)$$

we can finally write the field equations as follows:

$$H_{z1} = AJ_0 (3.8322r/a) \sin \omega t \sin 2\pi z/Z \qquad (2.27)$$

$$H_{r1} = -1.7670 AJ_1 (3.8322r/a) \sin \omega t \cos 2\pi z/Z \qquad (2.28)$$

$$E_{\sigma 1} = -376.73 AJ_1 (3.8322r/a) \cos \omega t \sin 2\pi z/Z \qquad (2.29)$$

$$H_{z2} = 2.4839 AJ_0 (7.0164r/a) \cos \omega t \sin \pi z/Z \qquad (2.30)$$

$$H_{r2} = -1.1985 AJ_1 (7.0164r/a) \cos \omega t \cos \pi z/Z \qquad (2.31)$$

$$E_{\sigma 2} = -935.76 AJ_1 (7.0164r/a) \sin \omega t \sin \pi z/Z \qquad (2.32)$$

Dynamic potentials

When the fields described by equations 2.27 through 2.32 act on an ionized gas, a dynamic potential trap is formed which confines both the ions and the electrons to regions near $z=Z/2$, $r=r_0$. The magnetic field strength is generally too small to affect the ions directly, but the electrons are trapped and the ions are subsequently restrained by space-charge potentials. In a cavity, the frequency of the fields is so high that neither the electrons nor the ions can follow instantaneous variations, but rather, their motion is determined by the time-average behavior of the fields.

If the electrons and ions in the trap reach approximate thermal equilibrium with each other then the motion of the ions is govererned by the space-charge potential, $\overline{X}$, given by Equation 1.66. This potential is:

$$\overline{X} = \frac{q}{32\pi^2 m}\left[\left(\frac{\Phi_2}{r}\right)^2 + \left(\frac{\Phi_2}{r}\right)^2\right]$$

In addition to the form shown in Equation 1.2, the flux may be defined as follows:

$$\Phi = \int_0^{2\pi} d\theta \int_0^r |B_z| r\, dr = 2\pi\mu \int_0^r |H_z| r\, dr \quad (2.34)$$

Thus $$\Phi_1 = 2\pi\mu A \sin 2\pi z/Z \int_0^r J_0(K_{c1}r) r\, dr$$

$$= 2\pi\mu A \sin 2\pi z/Z \frac{r}{K_{c1}} J_1(K_{c1}r) \quad (2.35)$$

but $$K_{c1} = 2\pi/\lambda_{c1} = 2\pi/1.6396a \quad (2.36)$$

$$\phi_1 = 1.6396a\mu A \sin 2\pi z/Z r J_1(3.8322r/a) \quad (2.37)$$

and similarly $$\phi_2 = 0.8955a 2.4839\mu A \sin \pi z/Z r J_1(7.0164r/a) \quad (2.38)$$

Hence $$\overline{X} = \frac{1}{4\pi^2}\frac{9}{2m_0}\frac{1}{4}\mu^2 a^2 A^2]1.6396^2 \sin 2\pi z/Z J_1^2(3.8322r/a)$$

$$+ 2.2243^2 \sin^2 \pi z/Z J_1^2(7.0164r/a)] \quad (2.39)$$

It is convenient to translate the origin of the $z$ axis to the center of symmetry of the cavity and to define a new variable $\xi$ $$\xi = \pi z/Z - \pi/2 \quad (2.40)$$

With this change, and by substituting the numerical values of the physical constants, 2.39 becomes $$\overline{X} = 0.87945 \times 10^{-3} a^2 A^2 [2.6883 \sin^2 2\xi J_1^2(3.8322r/a) + 4.9475 \cos^2 \xi J_1^2(7.0164r/a)] \quad (2.41)$$

Exact contours of $\overline{X}$ in the $(\xi, r)$ plane can be easily computed from 2.41 as follows:
Set $$M = 2.6883 J_1^2(3.8322r/a) \quad (2.42)$$

$$N = 4.9475 J_1^2(7.0164r/a) \quad (2.43)$$

$$P = 0.87945 \times 10^{-3} a^2 A^2 \quad (2.44)$$

Then, since $$M \sin^2 2\xi + N \cos^2 \xi \equiv M(1 - \cos^2 2\xi) + N(1 + \cos 2\xi)/2 \quad (2.45)$$

one gets $$M \cos^2 2\xi - N/2 \cos 2\xi + \langle V\rangle/P - M - N/2 = 0 \quad (2.46)$$

$$\cos 2\xi = \frac{N/2 \pm \sqrt{N^2/4 - 4M(\langle V\rangle/P - M - N/2)}}{2N} \quad (2.47)$$

These contours are shown in FIG. 12, where they are plotted for the value of $a^2A^2 = 10,000$. In addition to the bottom of the potential well 122, two points 124 and 126 are of particular interest: The point 124 ($\xi = 0$, $r = 0.262a$) where the potential has an absolute maximum of $13.350 \times 10^{-4} a^2 A^2$, and the point 126 ($\xi = 0$, $r = 0.762a$) where the potential has a saddle point, corresponding to a relative maximum in the $r$ direction of $5.206 \times 10^{-4} a^2 A^2$. In other words, the rim of the potential well is tilted and the saddle point 126 is the spout. The potential of the saddle point is therefore the limiting potential for containment purposes.

In FIG. 13, the plot "XX" is taken through the center of FIG. 12, and the plot "YY" is taken along Y—Y of FIG. 12. The critical points 122, 124, and 126 are shown in both FIG. 12 and FIG. 13.

Power dissipation

Under steady state conditions most of the power will be dissipated in the walls of the cavity by skin losses. The power dissipated per unit area of skin is $$P_s = H_t^2 R_s / 2 \quad (2.48)$$

where $H_t$ is the tangential component of magnetic field and $R_s$ is the skin resistance.

$$R_s = \sqrt{\pi f \mu / \sigma} = \sqrt{\pi \eta / \lambda_0 \sigma} = \sqrt{\pi \eta / 0.8997 a\sigma} = 38.39/\sqrt{a\sigma} \quad (2.49)$$

where $f$ = frequency = $\omega/2\pi$ $\sigma$ = conductivity of wall material in mhos At room temperature, we have $\sigma = 6.17 \times 10^7$ for silver and $5.80 \times 10^7$ for copper. Thus, $$R_s = 4.88 \times 10^{-3}/\sqrt{a} \text{ (silver)} \quad (2.50)$$

$$R_s = 5.04 \times 10^{-3}/\sqrt{a} \text{ (copper)}$$

The tangential magnetic field is found from Equations 2.27, 2.28, 2.30 and 2.31.

We have therefore (for silver walls)

$$W_{s1} = 2.44 \times$$

$$10^{-3}/\sqrt{a}\left[2\int_0^{2\pi} d\theta \int_0^a H_{r1}^2 r\, dr + a\int_0^{2\pi} d\theta \int_0^z H_{z1}^2 dz\right]$$

$$= 2.44 \times 10^{-3}/\sqrt{a}\left[4\pi A^2 \int_0^a 1.7670^2 J_1^2(3.8322r/a) r\, dr\right.$$

$$\left. + 2\pi A^2 a \int_0^z J_0^2(3.8322) \sin^2 2\pi z/Z dz\right] \quad (2.51)$$

Now $$\int_0^a J_1^2(K_{c1}r) r\, dr = \frac{a^2}{2}[J_1^2(K_c r) - J_0(K_c r) J_2(K_c r)]_0^a$$

$$= -\frac{a^2}{2} J_0(K_{c1}a) J_2(K_c a) = -\frac{a^2}{2} J_0(3.8322) J_2(3.8322) \quad (2.52)$$

and therefore $$W_{s1} = 2.44 \times 10^{-3}/\sqrt{a}\left[-4\pi A^2 (1.7670)^2 \frac{a^2}{2} J_0(3.8322 J_2)\right.$$

$$\left. + 2\pi A^2 J_0^2(3.8322) \frac{aZ}{2}\right] \quad (2.53)$$

and remembering 2.5

$$W_{s1} = 7.78 \times 10^{-3} A^2 a^2 / \sqrt{a} \quad (2.54)$$

Similarly $$W_{s2} = 5.94 \times 10^{-3} A^2 a^2 / \sqrt{a} \quad (2.55)$$

and the total dissipated power is $$W = 137.2 \times 10^{-4} A^2 a^2 / \sqrt{a} \quad (2.56)$$

We have already seen that the maximum confining potential at the saddle points is $$\overline{X}_s = 5.206 \times 10^{-4} A^2 a^2 \qquad (2.57)$$

hence the power (in watts) required to sustain a given potential (in volts) is $$W = 26.34 \cdot \overline{X}_s / \sqrt{a} \qquad (2.58)$$

where "$a$" is in meters. Since "$a$" is related to $\lambda_0$ by 2.4 and of course $\lambda_0 = c/f$, relation (2.58) can be employed to relate the operating power to the frequency.

*Coupling*

Circular polarization can be obtained only if the fields have the proper phase and amplitude. These parameters can be controlled by suitable choice of feed points. If a single oscillator is used to excite the cavity, advantage can be taken of the fact that the $TE_{012}$ mode has odd symmetry and the $TE_{021}$ mode has even symmetry with respect to the symmetry plane $\xi = 0$. This may be noted by reference to the electromagnetic wave patterns of FIGS. 10 and 11. Thus, if energy is fed through two ports symmetrically located with respect to $\xi = 0$, and the two ports are excited in quadrature, the phase relationship of the fields in the cavity appear as shown in FIG. 14. The solid line vectors represent input 1 and input 2 as indicated by the legends. Both of the two inputs contribute to the excitation of both modes. The dashed line vectors identified by mode designations are the vector resolution of the input signals. With the input signals being applied to the cavity on opposite sides of the cavity center line, the vector diagram properly shows the $TE_{012}$ vector leading the $TE_{021}$ vector by 90° for the one input, and lagging by 90° for the other input, which is the relationship indicated by the mode diagrams of FIGS. 10 and 11, on opposite sides of the center line of the cavity.

It is clear that the modes of the cavity are excited in phase quadrature. The amplitude can be controlled by suitable choice of the position of the ports. Since the same field is involved in the coupling mechanism for each mode (namely, the tangential H field at the wall), the polarizability of each port will be identical for each mode and the coupling depends exclusively on position. Thus, the position must be chosen so that the correct amount of power is fed to each mode to sustain the desired amplitude against the skin losses. The ratio of the power to each mode is found from 2.54 and 2.55.

$$\frac{W_{s1}}{W_{s2}} = \frac{7.78}{5.94} = 1.309 \qquad (2.59)$$

The power transmitted through the coupling port is proportional to the power density at the wall, i.e. to the square of the tangential H field. We consider two cases: The first, with the input ports on the side wall of the cavity, and located at $\pm \xi i$; the second, with the ports on the end plates of the cavity and located at $r_i$.

In the first case we have, from 2.27, 2.30 and 2.40

$$1.309 = \frac{H_{z1}^2}{H_{z2}^2} = \frac{J_0^2(3.8322) \sin^2 2\xi_i}{(2.4839)^2 J_0^2(7.0164) \cos^2 \xi_i} \qquad (2.60)$$

This equation does not admit of a real solution for $\xi_i$, since it yields sin $\xi = 1.05$. Therefore, the input ports cannot be located on the curved surface of the cavity. In the second case we have, from 2.28 and 2.31

$$1.309 = \frac{H_{r1}^2}{H_{r2}^2} = \frac{(1.7670)^2 J_1^2(3.8322 r_i/a)}{(1.1985)^2 J_1^2(7.0164 r_i/a)} \qquad (2.61)$$

This transcendental equation can be solved numerically for $r_1$ with the result that the input ports must be located at $$r_1 = 0.2703 a \qquad (2.62)$$

Thus, the preferred position of the input ports is fully established. The coupling coefficient of course depends on the loaded Q of the cavity and hence on the frequency as well as the gas loading of the cavity.

If the cavity 140 is fed by waveguides, one illustrative configuration is shown in FIG. 15, where a short-slot coupler 142 is used to divide the power from a single source 144 equally between the two input ports 146 and 148, and to provide at the same time a phase shift of 90°.

FIG. 16 illustrates an arrangement which is preferred for larger cavities in view of the ease of independently adjusting amplitude and phase. In FIG. 16, a "MOPAs" system of a master oscillator 152 and two power amplifiers 154 and 156 is employed. The phase shifter 158 controls the relative phase of the signals applied to the cavity 160 through waveguides 162 and 164 to ports 166 and 168, respectively. Suitable gain control circuits 166 and 168 permit independent control of the amplitude of the two modes excited in cavity 160.

The coupling ports 166 and 168 are placed where the coupling is strong to one mode and zero to the other. Such positions are easily found: A coupling port 168 located half-way across the cylindrical surface at $\xi = 0$ couples to the $TE_{021}$ mode only, but not to the $TE_{012}$ mode; conversely, a port 166 located at $r = 0.54617 a$ couples to the $TE_{012}$ mode only and not to the $TE_{021}$ mode. Coupling can be made through a window if the feed line is a waveguide, or through loops if the feed line is coaxial, depending on the operating frequency.

FIGS. 17 and 18 are diagrammatic views of a cavity of the type shown and described in connection with FIGS. 10 through 16 of the drawings. FIG. 18 is a partial cross-sectional view through the center of FIG. 17. In these figures of the drawings, the waveguide input structure may be of either of the forms shown in FIGS. 15 and 16, and suitable adjustable "plungers" shown schematically at 182 and 184 may be provided to control coupling to the ports 186 and 188. The central cylindrical microwave cavity 190 may be provided with a series of vanes 192 secured to the inner cylindrical surface of the cavity and extending parallel to the axis of the cavity. As these vanes are everywhere perpendicular to the lines of the electric fields of both desired modes, they do not affect the mode of operation of the cavity to any significant extent.

The cavity 190 is also provided with a gas inlet 194 and an outlet 196. The inlet tube 194 passes through and has its output orifice at the inner end of one of the vanes 192. The outlet 196 is coupled to the chamber 190 near its bounding conductive walls.

With regard to the locations of the vanes 192, and the input and output orifices, attention is directed to the dashed line 192' superimposed on the diagram of FIG. 12 and the point 126' shown in FIG. 17. As indicated by these figures, the input orifice is positioned just within the potential well, defined by the dash-dot line passing through point 126 of FIG. 12, as the ends of the vanes 192 extend beyond this radial line. Accordingly, gas injected into cavity 190 through the inlet 194 will become ionized and held within the "trap."

Returning to the apparatus of FIGS. 17 and 18, the disclosed embodiment of the invention also includes a heat exchanger 202 which may, for example, include water which can be heated to steam and employed to perform useful work, if desired. To facilitate transfer of heat from the microwave chamber 190 to the liquid which may be contained within heat exchanger 202, the cavity 190 may be provided with cooling fins 204. In addition, the liquid may freely pass into the space 206 within the vanes 192.

As mentioned above, it is contemplated that some particle combinations may occur within the dynamic trap formed in microwave chamber 190. Thus, if deuterium or tritium is injected into the trap through the inlet 194, it is captured within the trap and is ionized. When two ionized deuterium molecules combine, the resultant helium atom and neutron will be produced with a substantial conversion of mass to energy, in accordance with the well known fusion reaction. The resultant helium atom and neutron will be produced with sufficient kinetic energy to be ejected from the trap, leaving electrons in the annular potential well. The neutrons will pass through the wall of microwave chamber 190 and will expend their energy in heating the fluid, such as water, within the heat exchanger 202. The helium gas which will collect along the walls of chamber 190 outside of the annular trap will be withdrawn through tube 196. The electrons which remain within the trap will follow trajectories as determined by the electromagnetic field potentials and the electron cloud space charge potential. As the electrons leave the potential well, they may be coupled to the cavity at relatively high energy levels at the vanes 192. This coupling to the microwave circuit may reinforce the excited electromagnetic modes within the cavity 190 and increase the efficiency of the apparatus.

The mechanism of coupling of the electrons to reinforce the $TE_{021}$ and $TE_{012}$ modes as the electrons leave the potential well may be better understood by a consideration of the motion of the electrons within the chamber 190 as a result of the rotating electromagnetic fields within the chamber, as illustrated in FIGS. 10 and 11. The solutioon of Maxwell's equations, as applied to the present system, indicates that a displacement current, which is synchronized in frequency with the microwave field pattern, will flow in annular rings which are principally concentrated in specific areas with respect to the field pattern. With reference to FIGS. 10 and 11, the displacement currents will be concentrated in zones indicated by the annular rings 212 and 214, shown in FIG. 10, and the corresponding annular current patterns 212' and 214', as shown in FIG. 11. These displacement currents follow a complex pattern in that they successively contract and expand as they pass through one another.

When the plasma is first ionized, the electrons and ions are uniformly distributed; however, because of the much greater mass and inertia of the positively charged ions, the displacement current is accomplished principally by movement of the electrons. While the high frequency field rotates about the annular line of minimum potential, the electrons do not rotate about this line. Instead, the displacement currents, which do rotate with the field pattern, are implemented by successive groups of electrons distributed throughout the chamber 190. The direction of the instantaneous displacement current, as shown in FIG. 10, is into or out of the paper. Accordingly, individual electrons tend to oscillate at the frequency of excitation of the microwave cavity in the peripheral direction, but not longitudinally or radially.

Now, in the case of deuterium or tritium, as noted above, a negatively charged electron cloud is formed within the annular trap or potential well zone, as the positively charged ions shoot out of the "well." The height of the potential barrier is inversely proportional to the mass of the charged particles; accordingly, positively charged ions readily escape, while the electrons tend to remain in the well. As the resultant electron cloud increases in density, a space charge is developed through the mutual repulsion forces of the many negatively charged electrons. The electrons are therefore forced outward from the bottom of the potential well 122 toward the "pouring spout" 126, as shown in FIGS. 12 and 13. As they move from the center of the potential well toward the pouring spout, their high frequency peripheral oscillation movements are superposed on their slow radial movement. During this portion of the trajectory, they give up much of the potential energy, imparted by the space charge (and resulting, of course, from the fusion reaction), to the microwave system. If they were allowed to "coast down" the potential hill to the wall of the cavity, they would regain of their kinetic energy, thus reducing the efficiency of the system. However, through the use of the vanes 192, as shown in FIGS. 17 and 18, the electrons may be collected at the point where they have given up most of their energy to the microwave field and may be conductively routed to the walls of the cavity 190 which are positively charged by bombardment of the ions. This action in picking up electrons at points where they are spent and have low kinetic energy is similar to the use of depressed collectors in some respects. In addition, the action of the electron cloud at the center of the potential well in providing a space charge potential to force the electrons outwardly is similar to the function performed by the potential between the cathode and the anode vanes of a magnetron. It is obvious, of course, that these analogies are imperfect and are merely proposed to assist in the understanding of the present invention.

For many purposes, it is desirable to generate a plasma and eject it in a desired direction. Such arrangements are useful in gas plasma propulsion systems or as a source of ionized gas for use in wind tunnels and the like. The direction of the "pouring spout" may be controlled by the physical geometry of the cavity. For example, in the case of the coils used in the arrangement of FIGS. 1 and 2, by increasing the spacing between two coils, the position of the "spout" can be shifted to direct plasma in the axial rather than the radial direction. Similarly in the case of microwave apparatus, the direction of the saddle point in the potential field may be changed by the selection of different interacting modes in chambers of various geometries.

In the foregoing discussions, a number of factors have been discussed on a theoretical basis. From a more practical standpoint, some guideposts with regard to the frequency of operation and operating pressures should be established. Thus, for example, it has been stated that the frequency of operation should be above the cyclotron resonance frequency of the ions of the plasma. In general, the cyclotron resonance frequency $f_{cr}$ is given by the following formula:

$$f_{cr} = 1/T = eB/m \qquad (3.1)$$

where $T$ is the period
$e$ is the charge of an electron
$m$ is the mass of the charged particle, and
$B$ is the magnetic field.

For the electron, the ratio $e/m$ is equal to $1.759 \times 10^{11}$ coulombs/kilogram. For a deuterium nucleus, the ratio is $4.73 \times 10^7$ and for trituim, for example, the ratio would be $3.16 \times 10^7$. In one apparatus, it is contemplated that alternating currents of the order of 100 amperes would be applied to an apparatus of the type shown in FIG. 6, in which the outer coil has a diameter of 20 inches, and the inner coil has a diameter of 10 inches. Under these conditions, the magnetic field $B$ would have a value of approximately 55 gauss or $5.5 \times 10^{-3}$ webers/$m^2$, and the resulting cyclotron resonance frequencies for deuterium and tritium would be about 260 and 170 kilocycles per second, respectively, and that of electrons would be about $9.3 \times 10^5$ kilocycles per second. To exceed the ion frequencies, it is planned to operate at a frequency of 10 megacycles. Frequencies above the electron resonance frequency may be used in microwave embodiments.

The pressure which is used in apparatus of the present invention will depend, of course, on the configuration of the electrical or microwave circuit, the frequency of excitation, and the type of gas, in addition to the available power. In general, with the specific apparatus and power level mentioned in the preceding paragraph, it is contemplated that gas pressures, prior to energization of the unit, will be in the order of $10^{-3}$ to $10^{-5}$ torr.

To fully appreciate some of the concepts presented in the foregoing description, it is useful to refer to text material relating to plasma and electromagnetic waves, such as Physics of Fully Ionized Gases, by Lyman Spitzer, Jr., published by Interscience Publishers, Inc. (New York), 1956; Fields and Waves in Modern Radio, by Simon Ramo and John R. Whinnery, published by John Wiley and Sons, Inc. (New York), 1949; Kinetic Theory of Gases, by E. H. Kennard, published by McGraw-Hill Book, Co., Inc. (New York), 1938; and The Mathematical Theory of Non-Uniform Gases, by Sydney Chapman and T. G. Cowling, published by Cambridge University Press (London), 1958.

It is to be understood that the above described arrangements are illustrative of the application of the principles of the invention. Numerous other arrangements within the scope of the invention may be devised by those skilled in the art. Thus, by way of example and not of limitation, the induction well may be centered at a single point, or encompass a volume of substantial size and of various geometries, in addition to the geometries producing annular line forms of potential wells described above; other known electrical and microwave techniques may be employed to obtain the desired induction potential well; and gases, such as air or any of its components, and most other gases, may be employed in addition to deuterium in the implementation of the invention in its broader aspects. Accordingly, from the foregoing, it is evident that various changes may be made in the present invention without departing from the spirit of the invention as defined in the appended claims.

What is claimed is:

1. In combination:
   an apparatus for generating a high frequency electromagnetic field having a closed inductive potential well;
   means for introducing gas into said well;
   means for exciting said apparatus at sufficient power levels to ionize and confine said gas in said potential well and to produce combinations of atoms of said gas, whereby positively charged ions are ejected from said potential well and a negative space charge is formed within said potential well; and
   means located just outside the potential well for collecting said electrons at relatively low kinetic energy levels near the point where they leave the potential well.

2. A combination as defined in claim 1, wherein said apparatus is a cylindrical conductive cavity, said cavity having conductive vanes extending inwardly from its curved wall toward the axis of the cylindrical cavity to form the collecting means.

3. A combination as defined in claim 1, wherein said apparatus is a conductively bounded waveguide cavity.

4. A combination as defined in claim 3, wherein said cavity is enclosed by a heat exchanger.

5. In combination:
   a container;
   means for generating a toroidally-shaped magnetic field which rotates continually about a toroidal line and in radial planes through the axis of the toroid, the resultant induction potential decreasing in magnitude to a minimum along a closed line within and spaced from the walls of said container; and
   a plasma located within said container so that the rotating magnetic field ionizes and compresses the plasma toward the zero potential line within said container.

6. A combination as defined in claim 5, wherein said magnetic field generating means is operated at a frequency which is significantly higher than the cyclotron resonance frequency of the ions of said plasma.

7. In combination:
   means for providing a body of ionized gas having its center following a closed line; and
   means for providing a high frequency magnetic field rotating in planes extending generally perpendicular to the closed line and having an induction potential which increases in intensity for at least a predetermined distance in all directions from the line.

8. In combination:
   a microwave cavity;
   means for exciting a first electromagnetic mode pattern in said cavity at a predetermined frequency;
   means for exciting a second different electromagnetic mode pattern in said cavity at the same frequency and in phase quadrature with said first electromagnetic field pattern to produce an induction potential well extending along a closed path; and
   means for introducing gas into said cavity for containment in said potential well.

9. In combination:
   a container;
   a gas plasma in said container; and
   means for generating a high frequency rotating magnetic field to produce an induction potential having a minimum intensity zone following a closed path about which the field rotates, said closed path being wholly within the container.

10. In combination:
    a cylindrical conductively bounded cavity; and
    means for generating both the $TE_{012}$ and the $TE_{021}$ electromagnetic modes in said cavity.

11. In combination:
    a container for gas; and
    means for generating a high frequency rotating magnetic field producing an induction potential having a minimum intensity zone following a closed generally toroidal path within the container about which the field rotates.

12. In combination:
    a container for gas;
    a gas plasma in said container;
    means for generating a rotating magnetic field which produces an induction potential having a minimum intensity zone following a closed path within the container about which the field rotates; and
    means for exciting said magnetic field generating means at a frequency above the cyclotron resonance frequency of the ions of said plasma.

13. In combination:
    a first coil having a central axis, a second coaxial coil connected in series opposition with said first coil to form a first pair of coils;
    a second pair of coils coaxial with said first pair of coils and also connected in series opposition;
    means for introducing gas in the annular space between the turns of said coils; and
    means for energizing said first and second pairs of coils in phase quadrature at intensity levels sufficient to ionize said gas.

14. A combination as defined in claim 13, wherein the gas is confined in the vicinity of said coils under initial reduced pressure conditions.

15. In combination:
    means for generating a high frequency moving magnetic field having a closed inductive potential well along a linear zone of reduced velocity of the magnetic field; and
    means for providing a microscopically neutral charged plasma in said well.

16. In combination:
    a container;
    a gas plasma in said container; and
    means for generating a high frequency moving magnetic field to produce a closed induction potential having a minimum intensity zone following a closed path about which the field moves, said closed path being wholly within the container.

17. In combination:
    an apparatus for generating a high frequency electromagnetic field having an inductive potential well having a minimum extending along a closed line;
    means for introducing gas into said well;
    means for exciting said apparatus at sufficient power levels to ionize said gas, to confine it within said potential well and to produce combinations of atoms of said gas, whereby particles of one polarity are ejected from said potential well and a space charge zone including particles of the other polarity is formed within said potential well; and means including conductive material located at a point of substantial inductive potential immediately outside said potential well for utilizing charged particles from the space charge zone to increase the efficiency of the generating apparatus.

18. In combination:

an apparatus for generating a high frequency electromagnetic field having a closed inductive potential well;

means for introducing gas into said well;

means for exciting said apparatus at sufficient power levels to ionize said gas to confine the gas within the potential well and to produce combinations of atoms of said gas, whereby particles of one polarity are ejected from said potential well and a space charge zone including particles of the other polarity is formed within said potential well; and means for picking up charged particles from said space charge zone at a region of substantial inductive potential immediately adjacent but outside of said potential well where they have given up much of their energy to the apparatus and have a low kinetic energy, whereby the efficiency of the apparatus is significantly improved.

19. A gas plasma apparatus comprising:

a cylindrical cavity; and means for ionizing gas along an annular zone within said cavity by the application of circularly polarized electromagnetic waves, said ionizing means including means for exciting said cavity at the same predetermined frequency and at different phases at two respectively different input cooling points.

References Cited

UNITED STATES PATENTS

| | | | |
|---|---|---|---|
| 3,022,236 | 2/1962 | Ulrich et al. | 315—111 X |
| 3,027,361 | 4/1962 | Hernquist | 315—111 X |
| 3,141,826 | 7/1964 | Friebrichs et al. | 315—111 X |
| 3,257,579 | 6/1966 | Delcroix et al. | 315—111 |
| 3,015,618 | 1/1962 | Stix | 176—3 X |
| 3,120,477 | 2/1964 | Hatch | 176—1 |
| 3,156,621 | 11/1964 | Josephson | 176—1 |
| 3,171,788 | 3/1965 | Gorman et al. | 176—1 |

REUBEN EPSTEIN, *Primary Examiner.*

U.S. Cl. X.R.

176—3; 313—161; 315—39, 111